(12) United States Patent
Douglas et al.

(10) Patent No.: US 11,514,405 B1
(45) Date of Patent: Nov. 29, 2022

(54) MAP CALENDAR GRAPHICAL USER INTERFACE WITH DYNAMIC TIME MOLD FUNCTIONALITY

(71) Applicant: Microsoft Technology Licensing, LLC, Redmond, WA (US)

(72) Inventors: Malia Douglas, Seattle, WA (US); Rachel Sirkin, Seattle, WA (US); Aaron E. Erlandson, Kirkland, WA (US); Stephen White, Grand Rapids, MI (US); Erin Greenly, Seattle, WA (US); Evan W. Lavender, Redmond, WA (US); Yoon Jin Lee, Woodinville, WA (US); Ilya Greysukh, Bellevue, WA (US); Eugene Ahn, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/320,991

(22) Filed: May 14, 2021

(51) Int. Cl.
*G06Q 10/10* (2012.01)
*G06F 3/04817* (2022.01)
(Continued)

(52) U.S. Cl.
CPC ....... *G06Q 10/1093* (2013.01); *G06F 3/0482* (2013.01); *G06F 3/0485* (2013.01);
(Continued)

(58) Field of Classification Search
CPC ... G06Q 10/109; G06Q 10/0631; G06F 16/50
See application file for complete search history.

(56) References Cited

U.S. PATENT DOCUMENTS 5,845,257 A    12/1998  Fu et al.
5,874,965 A    2/1999   Takai et al.
(Continued)

FOREIGN PATENT DOCUMENTS

CN    101145223 A    3/2008
CN    101520862 A    9/2009
(Continued)

OTHER PUBLICATIONS

"Notice of Allowance Issued in U.S. Appl. No. 16/414,374", dated Jun. 23, 2021, 9 Pages.
(Continued)

*Primary Examiner* — Cesar B Paula
*Assistant Examiner* — Sajeda Muhebbullah
(74) *Attorney, Agent, or Firm* — International IP Law Group, PLLC

(57) ABSTRACT

A computer-implemented method for implementing a map calendar application and corresponding map calendar GUI that provide time mold functionality is described herein. The method includes executing the map calendar application to provide the map calendar GUI surfaced on a display. The map calendar GUI includes an interactive visualization of a map calendar, which includes a continuous, manipulable sequence of calendar content data corresponding to calendar content items that are organized based on units of time within a coordinate plane. The method also includes categorizing the calendar content items based on time categories corresponding to the calendar content items and identifying time patterns corresponding to the categorized calendar content items. The method further includes generating a time mold of the map calendar based on the identified time patterns and visually overlaying the time mold onto corresponding calendar content items within the interactive visualization.

20 Claims, 12 Drawing Sheets

(51) Int. Cl.
  *G06F 3/0485* (2022.01)
  *G06F 3/0482* (2013.01)
  *G06F 16/54* (2019.01)
  *G06F 16/50* (2019.01)
  *G06F 16/58* (2019.01)
  *G06Q 10/06* (2012.01)

(52) U.S. Cl.
  CPC .......... *G06F 3/04817* (2013.01); *G06F 16/50* (2019.01); *G06F 16/54* (2019.01); *G06F 16/58* (2019.01); *G06Q 10/06* (2013.01); *G06Q 10/0631* (2013.01); *G06Q 10/06311* (2013.01); *G06Q 10/06312* (2013.01); *G06Q 10/063114* (2013.01); *G06Q 10/063116* (2013.01); *G06Q 10/10* (2013.01); *G06Q 10/109* (2013.01); *G06Q 10/1095* (2013.01); *G06Q 10/1097* (2013.01); *G06F 2203/04806* (2013.01)

(56) References Cited

U.S. PATENT DOCUMENTS

| | | | |
|---|---|---|---|
| 5,970,466 | A | 10/1999 | Detjen et al. |
| 6,978,271 | B1 | 12/2005 | Hoffman et al. |
| 7,305,491 | B2 | 12/2007 | Miller et al. |
| 7,318,040 | B2 | 1/2008 | Doss et al. |
| 7,325,198 | B2 | 1/2008 | Adcock et al. |
| 7,689,448 | B2 | 3/2010 | Fu et al. |
| 7,830,751 | B2 | 11/2010 | Parees et al. |
| 8,295,126 | B2 | 10/2012 | Wood et al. |
| 8,375,292 | B2 * | 2/2013 | Coffman ................ G06Q 10/10 715/232 |
| 8,434,026 | B2 | 4/2013 | Stewart et al. |
| 8,510,677 | B2 * | 8/2013 | van Os ................ G06F 3/0483 715/833 |
| 8,538,992 | B1 | 9/2013 | Lawyer et al. |
| 8,607,250 | B2 | 12/2013 | Oral et al. |
| 8,713,435 | B2 | 4/2014 | Guan et al. |
| 9,195,972 | B2 | 11/2015 | Gopinath et al. |
| 9,292,482 | B1 | 3/2016 | Thiesen et al. |
| 9,438,649 | B2 * | 9/2016 | Tallett ................ G06Q 10/1093 |
| 9,843,895 | B2 | 12/2017 | Huang et al. |
| 10,032,135 | B2 | 7/2018 | Siu et al. |
| 10,140,324 | B2 | 11/2018 | Massarella et al. |
| 10,521,084 | B2 | 12/2019 | Anzures et al. |
| 10,586,216 | B2 | 3/2020 | Miller et al. |
| 10,769,132 | B1 | 9/2020 | Sharif et al. |
| 2003/0088427 | A1 | 5/2003 | Elsey et al. |
| 2004/0104937 | A1 | 6/2004 | An |
| 2005/0039142 | A1 | 2/2005 | Jalon et al. |
| 2005/0050044 | A1 | 3/2005 | Takagi et al. |
| 2006/0136121 | A1 | 6/2006 | Eisen |
| 2007/0005409 | A1 | 1/2007 | Boss et al. |
| 2007/0150502 | A1 | 6/2007 | Bloebaum et al. |
| 2007/0180375 | A1 | 8/2007 | Gittelman et al. |
| 2007/0180377 | A1 | 8/2007 | Gittelman et al. |
| 2007/0186193 | A1 | 8/2007 | Curran |
| 2007/0300163 | A1 * | 12/2007 | Alford ................ G06Q 10/1093 715/764 |
| 2008/0022201 | A1 | 1/2008 | Chen et al. |
| 2008/0059618 | A1 | 3/2008 | May et al. |
| 2008/0141145 | A1 | 6/2008 | Klausmeier |
| 2008/0162234 | A1 | 7/2008 | Lu et al. |
| 2008/0177609 | A1 | 7/2008 | Grieb et al. |
| 2009/0040875 | A1 | 2/2009 | Buzescu et al. |
| 2009/0112986 | A1 | 4/2009 | Caceres |
| 2009/0168609 | A1 | 7/2009 | Weir et al. |
| 2010/0070888 | A1 | 3/2010 | Watabe et al. |
| 2010/0075648 | A1 | 3/2010 | Matsuoka et al. |
| 2010/0162105 | A1 | 6/2010 | Beebe et al. |
| 2010/0175001 | A1 | 7/2010 | Lazarus et al. |
| 2010/0330974 | A1 | 12/2010 | Balannik et al. |
| 2011/0087707 | A1 | 4/2011 | Abraham |
| 2011/0216628 | A1 | 9/2011 | Nalla et al. |
| 2011/0252351 | A1 | 10/2011 | Sikora et al. |
| 2011/0264613 | A1 * | 10/2011 | Yarvis ................ G06Q 10/06 706/12 |
| 2011/0305437 | A1 | 12/2011 | Sakaguchi et al. |
| 2012/0084286 | A1 | 4/2012 | Hubner et al. |
| 2012/0197900 | A1 | 8/2012 | Mandre |
| 2012/0233563 | A1 | 9/2012 | Chakra et al. |
| 2013/0103658 | A1 | 4/2013 | Travis |
| 2014/0047312 | A1 | 2/2014 | Ruble et al. |
| 2014/0074536 | A1 | 3/2014 | Meushar et al. |
| 2014/0136263 | A1 | 5/2014 | Lee et al. |
| 2014/0156597 | A1 | 6/2014 | Hakami et al. |
| 2014/0330551 | A1 | 11/2014 | Bao et al. |
| 2014/0365951 | A1 | 12/2014 | Fernandes et al. |
| 2015/0156026 | A1 | 6/2015 | Gault et al. |
| 2015/0178690 | A1 | 6/2015 | May et al. |
| 2015/0199077 | A1 | 7/2015 | Zuger et al. |
| 2015/0268839 | A1 | 9/2015 | Tallett |
| 2015/0294273 | A1 | 10/2015 | Barraci et al. |
| 2015/0347982 | A1 | 12/2015 | Jon et al. |
| 2015/0378619 | A1 | 12/2015 | Maeda et al. |
| 2015/0379413 | A1 | 12/2015 | Robertson et al. |
| 2015/0379476 | A1 | 12/2015 | Chaudhri et al. |
| 2016/0104119 | A1 | 4/2016 | Von et al. |
| 2016/0189111 | A1 | 6/2016 | Bookallil et al. |
| 2016/0203444 | A1 | 7/2016 | Frank et al. |
| 2016/0259761 | A1 | 9/2016 | Laborczfalvi |
| 2016/0275458 | A1 | 9/2016 | Meushar et al. |
| 2016/0350721 | A1 | 12/2016 | Comerford et al. |
| 2016/0364698 | A1 | 12/2016 | Bouz et al. |
| 2016/0370985 | A1 | 12/2016 | Tallett |
| 2017/0024705 | A1 | 1/2017 | Richardson et al. |
| 2018/0025323 | A1 * | 1/2018 | Pintos ................ G06F 3/0482 705/7.18 |
| 2018/0077542 | A1 | 3/2018 | Xie et al. |
| 2018/0089632 | A1 | 3/2018 | Singh et al. |
| 2018/0095938 | A1 | 4/2018 | Monte |
| 2018/0114198 | A1 | 4/2018 | Ghotbi et al. |
| 2018/0189744 | A1 | 7/2018 | Frank et al. |
| 2018/0275846 | A1 * | 9/2018 | Perret ................ G06Q 10/1093 |
| 2018/0336532 | A1 | 11/2018 | Hillery |
| 2018/0341924 | A1 | 11/2018 | Desportes et al. |
| 2019/0102370 | A1 | 4/2019 | Nelson et al. |
| 2019/0121994 | A1 | 4/2019 | Embiricos et al. |
| 2019/0155862 | A1 | 5/2019 | Yi et al. |
| 2020/0363910 | A1 | 11/2020 | Engrav et al. |
| 2020/0364199 | A1 | 11/2020 | Engrav et al. |
| 2020/0364673 | A1 | 11/2020 | Engrav et al. |
| 2021/0272069 | A1 | 9/2021 | Douglas et al. |

FOREIGN PATENT DOCUMENTS

| | | |
|---|---|---|
| CN | 105279637 A | 1/2016 |
| CN | 109344294 A | 2/2019 |
| WO | 2018212879 A1 | 11/2018 |

OTHER PUBLICATIONS

"Behavior and Format of the Date and Time Field", Retrieved From: https://docs.microsoft.com/en-us/previous-versions/dynamicscrm-2016/administering-dynamics-365/dn946904(v=crm.8)?redirectedfrom=MSDN, Nov. 28, 2016, 10 Pages.

"Google Calendar", Retrieved from: https://www.google.com/calendar/about/, Retrieved Date: Feb. 11, 2021, 2 Pages.

"Using Date, Date/Time, and Time Values in Formulas", Retrieved from: https://help.salesforce.com/articleView?id=sf.formula_using_date_datetime.htm&type=5, Retrieved Date: Feb. 11, 2021, 4 Pages.

"Notice of Allowance Issued in U.S. Appl. No. 14/220,386", dated May 6, 2016, 18 Pages.

"Final Office Action Issued in U.S. Appl. No. 15/256,666", dated Apr. 23, 2019, 14 Pages.

"Non Final Office Action Issued in U.S. Appl. No. 15/256,666", dated Nov. 16, 2018, 11 Pages.

"Final Office Action Issued in U.S. Appl. No. 16/414,317", dated Jul. 1, 2020, 17 Pages.

"Non Final Office Action Issued in U.S. Appl. No. 16/414,317", dated Jan. 7, 2020, 15 Pages.

(56) References Cited

OTHER PUBLICATIONS

"Non Final Office Action Issued in U.S. Appl. No. 16/414,317", dated Oct. 27, 2020, 16 Pages.
"Notice of Allowance Issued in U.S. Appl. No. 16/414,317", dated Mar. 16, 2021, 9 Pages.
"Non Final Office Action Issued In U.S. Appl. No. 16/414,367", dated Jan. 13, 2021, 17 Pages.
"Notice of Allowance Issued in U.S. Appl. No. 16/414,367", dated Mar. 12, 2021, 16 Pages.
"Non Final Office Action Issued in U.S. Appl. No. 16/414,374", dated Sep. 8, 2020, 12 Pages.
Agnantis, et al., "Intelligent Calendar Applications: A Holistic Framework based on Ontologies", In International Journal of Artificial Intelligence, vol. 14, Issue 2, Oct. 2016, 21 Pages.
Cranshaw, et al., "Calendar.help: Designing a Workflow-Based Scheduling Agent with Humans in the Loop", In Repository of arXiv: 1703.08428v1, Mar. 24, 2017, 12 pages.
Hinnant, Howard, "Chrono-Compatible Low-Level Date Algorithms", Retrieved From: https://howardhinnant.github.io/date_algorithms.html, Sep. 7, 2013, 24 Pages.
Krzywicki, et al., "Closed Pattern Mining for the Discovery of User Preferences in a Calendar Assistant", In Book of New Challenges in Applied Intelligence Technologies, Jan. 2008, 11 Pages.
Masoodian, et al., "A Comparison of Linear and Calendar Travel Itinerary Visualizations for Personal Digital Assistants", In Proceedings of the OZCHI, the CHISIG Annual Conference on Human-Computer Interaction, Nov. 20, 2004, 10 Pages.
"International Search Report and Written Opinion Issued in PCT Application No. PCT/US20/028027", dated Jul. 20, 2020, 11 Pages.
"International Search Report and Written Opinion Issued in PCT Application No. PCT/US20/028029", dated Jul. 23, 2020, 11 Pages.
"International Search Report and Written Opinion Issued in PCT Application No. PCT/US20/028030", dated Jun. 2, 2020, 11 Pages.
"Non Final Office Action Issued in U.S. Appl. No. 17/321,050", dated Feb. 16, 2022, 34 Pages.
Date-constrained Google Search result for "universal time" and "coordinated universal time", Obtained by Examiner on Mar. 10, 2022 from Google search engine, 2019, 2 Pages.
"How to Convert UTC Time to Local Time", Retrieved from: https://web.archive.org/web/20210209121703/https://support.microsoft.com/en-us/topic/how-to-convert-utc-time-to-local-time-0569c45d-5fb8-a516-814c-75374b44830a, Dec. 8, 2015, 3 Pages.
"Time Configuration", Retrieved from: https://docs.servicenow.com/bundle/sandiego-platform-administration/page/administer/core-configuration/concept/p_Time.html, Jul. 15, 2015, 2 Pages.
"Notice of Allowance Issued in U.S. Appl. No. 17/321,093", dated Mar. 21, 2022, 9 Pages.
"Final Office Action Issued in U.S. Appl. No. 17/321,050", dated May 10, 2022, 45 Pages.
"Non Final Office Action Issued in U.S. Appl. No. 17/321,093", dated Jun. 3, 2022, 21 Pages.
"How to Translate UTC to your Time", Retrieved from: https://earthsky.org/astronomy-essentials/universal-time/, Jan. 1, 2018, 6 Pages.
"Use Google Calendar in Different Time Zones", Retrieved From: https://support.google.com/calendar/answer/37064?hl=en&co=GENIE.Platform%3DDesktop, Retrieved Date: May 3, 2022, 01 Page.
"International Search Report and Written Opinion Issued in PCT Application No. PCT/US22/024180", dated Jun. 1, 2022, 17 Pages.
"International Search Report & Written Opinion issued in PCT Application No. PCT/US22/024321", dated Jul. 8, 2022, 14 Pages.
"International Search Report & Written Opinion issued in PCT Application No. PCT/US22/024182", dated Jul. 11, 2022, 14 Pages.
"Office Action Issued in European Patent Application No. 20723715.7", dated Sep. 6, 2022, 8 Pages.
"Notice of Allowance Issued in U.S. Appl. No. 17/321,050", dated Oct. 12, 2022, 9 Pages.

* cited by examiner

100

100

100

Tell me what you want to do

> I want to make Game planner Deck for 3 hours before Fri|

∨ May 25-31

Every [ All-Hands Meeting ]

⊘ Block 30 minutes before
[ Focus Time ]

Every [ Connector ]

⊘ Block 10 minutes before
[ 🚶 Walk ]

⊘ Block 12 minutes before
[ 🚶 Walk ]

May [ Go to Gym ]

🕐 1 hour  🕐 3 Times

⊘ Block
Transportation time 🏁

Every [ Connector ]

🕐 6 hours  🕐 Mon-Fri

⊘ During after lunch

Every [ Family time ]

🕐 > 2 hour  🕐 Everyday

⊘ With [ Family game night ]

∧ All items (24)

MAP CALENDAR GRAPHICAL USER INTERFACE WITH DYNAMIC TIME MOLD FUNCTIONALITY

BACKGROUND

The present disclosure relates to calendar applications. In particular, the present disclosure relates to a map calendar application that provides a map calendar graphical user interface (GUI) with dynamic time mold functionality.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for implementing a map calendar application and a corresponding map calendar graphical user interface (GUI) that provide time mold functionality in a computing system including a processor and a display operatively coupled to each other is described. The method includes executing, via the processor, the map calendar application on the computing system to provide the map calendar GUI surfaced on the display, where the map calendar GUI includes an interactive visualization of a map calendar, and where the map calendar includes a continuous, manipulable sequence of calendar content data corresponding to calendar content items that are organized based on units of time within a coordinate plane. The method also includes categorizing, via the map calendar application and the map calendar GUI, the calendar content items based on a time category corresponding to each calendar content item, as well as identifying, via the map calendar application, time patterns corresponding to the categorized calendar content items. The method further includes generating a time mold of the map calendar based on the identified time patterns corresponding to the categorized calendar content items, as well as visually overlaying, via the surfaced map calendar GUI, the time mold onto corresponding calendar content items within the interactive visualization, where the time mold includes visually-distinguishable blocks representing discrete chunks of time corresponding to the identified time patterns for the calendar content items.

In another embodiment, a computing system is described. The computing system includes a processor, a display operatively coupled to the processor, and a computer-readable storage medium operatively coupled to the processor. The computer-readable storage medium includes computer-executable instructions that, when executed by the processor, cause the processor to execute a map calendar application to provide a map calendar GUI surfaced on the display, where the map calendar GUI includes an interactive visualization of a map calendar, and where the map calendar includes a continuous, manipulable sequence of calendar content data corresponding to calendar content items that are organized based on units of time within a coordinate plane. The computer-executable instructions, when executed by the processor, also cause the processor to categorize, via the map calendar application and the map calendar GUI, the calendar content items based on a time category corresponding to each calendar content item, as well as to identify, via the map calendar application, time patterns corresponding to the categorized calendar content items. The computer-executable instructions, when executed by the processor, further cause the processor to generate a time mold of the map calendar based on the identified time patterns corresponding to the categorized calendar content items, as well as to visually overlay, via the surfaced map calendar GUI, the time mold onto corresponding calendar content items within the interactive visualization, where the time mold includes visually-distinguishable blocks representing discrete chunks of time corresponding to the identified time patterns for the calendar content items.

In another embodiment, a computer-readable storage medium is described. The computer-readable storage medium includes computer-executable instructions that, when executed by a processor of a computing system, cause the processor to execute a map calendar application to provide a map calendar GUI surfaced on a display that is operatively coupled to the processor, where the map calendar GUI includes an interactive visualization of a map calendar, and where the map calendar includes a continuous, manipulable sequence of calendar content data corresponding to calendar content items that are organized based on units of time within a coordinate plane. The computer-executable instructions, when executed by the processor, also cause the processor to categorize, via the map calendar application and the map calendar GUI, the calendar content items based on a time category corresponding to each calendar content item, as well as to identify, via the map calendar application, time patterns corresponding to the categorized calendar content items. The computer-executable instructions, when executed by the processor, further cause the processor to generate a time mold of the map calendar based on the identified time patterns corresponding to the categorized calendar content items, as well as to visually overlay, via the surfaced map calendar GUI, the time mold onto corresponding calendar content items within the interactive visualization, where the time mold includes visually-distinguishable blocks representing discrete chunks of time corresponding to the identified time patterns for the calendar content items.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 6 is a schematic view of an exemplary map calendar GUI window showing the manner in which the time molds described herein enable automatic or semi-automatic scheduling based on the user's time patterns;

DETAILED DESCRIPTION

Figure 1A:
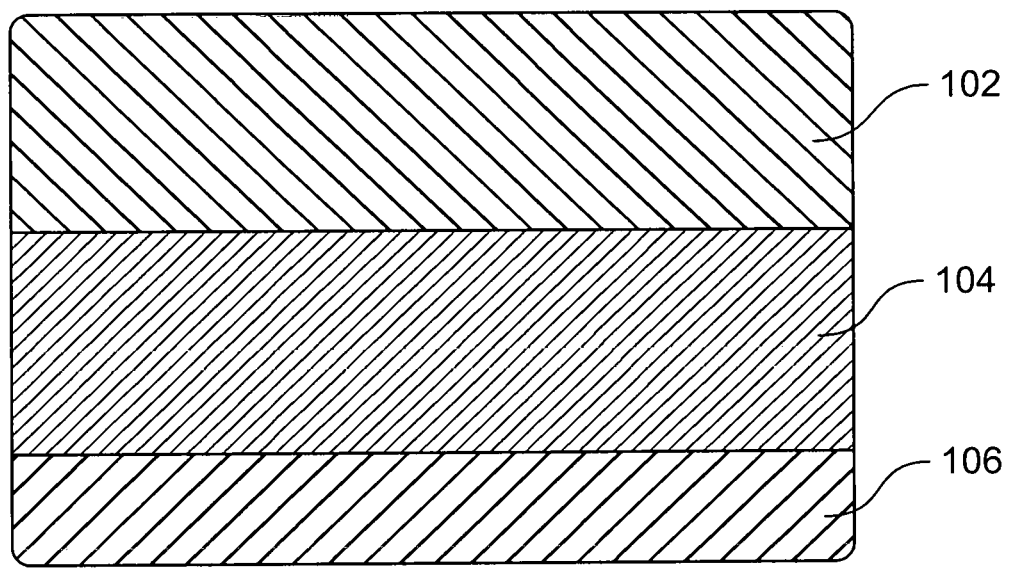
FIG. 1A is a simplified schematic view of an exemplary time mold according to embodiments described herein.

In general, people are habit-forming in terms of the manner in which they utilize their time. Moreover, the constraints of the modern world typically result in people following schedules that are cyclical or repetitive in nature. For example, many people work on weekdays from 8 AM to 5 PM (according to the Gregorian calendar system), spend time with their families in the evenings, and run errands on the weekends. As a result, while the individual details of each person's schedule may vary, the broad categories of time tend to follow repeating patterns. As an example, while a person may have different types of work meetings every weekday, the fact that the person schedules work meetings on weekdays between 8 AM and 5 PM may not vary significantly. As another example, while a person may switch between various forms of exercise, the fact that the person habitually exercises on weekend mornings may not vary significantly. Accordingly, an analysis of the person's schedule would reveal that the person's utilization of time is generally cyclical or repetitive.

Furthermore, as a result of the cyclical/repetitive nature of time utilization, people generally view time in a manner that is not adequately supported by conventional electronic calendar applications. In particular, according to conventional electronic calendar applications, electronic calendars are presented to users of computing systems in the form of graphical user interfaces (GUIs) that allow the users to visualize the electronic calendars according to particular units of time, e.g., generally including groupings of days, weeks, months, or years. Such GUIs also allow the users to interact with the corresponding electronic calendars to add events and/or other calendar content items corresponding to the specific units of time within the electronic calendars. However, conventional electronic calendar applications do not identify, analyze, or utilize the users' time patterns in any significant manner. For example, while some conventional electronic calendar applications are capable of rescheduling events at the same general times every day or every week, such electronic calendar applications do not utilize this information to determine any specific time patterns for the user's overall calendar, much less to enable enhanced scheduling functionality. Accordingly, such calendar applications are generally not optimized based on users' actual expectations and experiences with respect to time.

The present techniques solve this issue by providing a map calendar application including a map calendar graphical user interface (GUI) that provides dynamic time mold functionality. As used herein, the term "map calendar GUI" refers to a machine-user interface including an interactive visualization that enables a user to visualize and interact with data corresponding to a map calendar application through graphical elements, icons, and the like rendered on the display of a computing system. In particular, the map calendar GUI described herein provides an electronic representation of time as a map calendar including a continuous, manipulable sequence of data organized as units of time within a coordinate plane. Moreover, the map calendar GUI enables user manipulation of the map calendar, resulting in real-time shifting and/or conversion of the units of time used to render calendar content items. Specifically, the map calendar GUI enables the map calendar to be panned (meaning that the user can scroll across the map calendar as though moving across a panorama) and zoomed (meaning that the user can zoom in or zoom out to view their map calendar according to different units of time).

According to embodiments described herein, the map calendar application, via the map calendar GUI, also provides for the categorization of calendar content items within the user's map calendar based on particular time categories corresponding to the calendar content items. Such time categories may include, for example, a work time category, a school time category, a personal time category, a family time category, a sleep time category, an exercise time category, a study time category, time categories related to specific energy levels and/or moods of the user, and/or any number of other generalized and/or user-specific time categories. Moreover, such time categories are then utilized to identify overarching time patterns corresponding to the user's map calendar, which are presented to the user in the form of a time mold that is representative of the cyclical and repetitive nature of the user's schedule. This time mold may then be used to enable various enhanced scheduling functionalities and user scenarios with respect to the map calendar application and corresponding map calendar GUI, as described further herein.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage media" refers specifically to non-transitory forms of computer-readable storage media and expressly excludes carrier waves and/or propagated signals.

Overview of Dynamic Time Mold Functionality Provided by Map Calendar GUI

The map calendar application described herein, in combination with the corresponding map calendar GUI, enable calendar content items within a user's map calendar to be analyzed and sorted based on various time categories (or combinations of time categories). As used herein, the term "calendar content item" refers to any suitable items or elements that the user desires to link to their map calendar. Such calendar content items may include, but are not limited to, events, appointments, media content (e.g., photographs, audio, video, and/or animations), social networking blurbs (e.g., social status updates and/or tweets), links (e.g., links to other applications and/or links to webpages), web-browsing history, reminders, and/or documents. In addition, as used herein, the term "time category" refers to any suitable labeling or categorization of calendar content items that are related in terms of their meaning to the user. Examples of time categories that may be used include, but are not limited to, a work time category, a school time category, a personal time category, a family time category, a sleep time category, an exercise time category, a study time category, time categories related to specific energy levels and/or moods of the user (e.g., a refresh time category, a low energy time category, a focus energy time category, and/or a social energy time category), and/or any number of other generalized and/or user-specific time categories (e.g., a wedding planning time category for a particular user who is planning to get married). As will be appreciated by those skilled in the art, an unlimited number of time categories are possible, and such time categories may range from being very generalized to being highly personalized to a particular user.

In various embodiments, the categorization of calendar content items is enabled by user input provided via the map calendar GUI and/or categorization techniques implemented via the map calendar application itself. More specifically, the map calendar GUI may provide the user with the ability to manually label calendar content items as belonging to particular time categories. In addition, the map calendar application may be configured to automatically infer time categories for calendar content items using a combination of machine learning techniques and context clues relating to particular calendar content items. Such machine learning techniques may include, for example, supervised learning techniques, unsupervised learning techniques, and/or reinforcement learning techniques. Moreover, context clues relating to calendar content items may include, for example, a type, a title, a location, an account, a time of day, a day of the week, and/or a list of attendees/invitees corresponding to particular calendar content items. As an example, if an event is associated with the user's work account (e.g., received at the user's work account or created by the user with respect to their work account), the map calendar application may automatically associate the event with the work time category. However, if an event is associated with the user's personal account (e.g., received at the user's personal account or created by the user with respect to their personal account), the map calendar application may automatically associate the event with the personal time category. As another example, if the title of an appointment indicates that the appointment is for one of the user's kids, the map calendar application may automatically associate the appointment with the family time category. As another example, if the type of calendar content item is social networking blurb, the map calendar application may automatically associate the social networking blurb with the personal time category. As another example, if the list of attendees/invitees for an event are all work colleagues (as indicated by their email account type, for example), the map calendar application may automatically associate the event with the work time category. As another example, if a calendar content item of any type is scheduled for late at night and/or on a weekend and the user's scheduling patterns indicate that the user rarely works outside of normal working hours, the map calendar application may associate the calendar content item with the personal time category, family time category, or the like. As will be appreciated by those skilled in the art, in practice, the map calendar application may utilize a combination of different context clues, such as those described above, to infer the time category for each calendar content item. Furthermore, in some cases, the map calendar application may perform semi-automatic categorization of the calendar content items, in which the map calendar application infers a list of possible time categories for each calendar content item, and the user manually selects one or more time categories that are most relevant.

The categorized calendar content items are then used to identify time patterns exhibited by the user, as evidenced by the location, arrangement, and/or ordering of the categorized calendar content items within the user's map calendar across various units of time. In addition, in some embodiments, monument calendar content items are used to further define such time patterns, where the term "monument calendar content item" is used herein to refer to a recurring calendar content item (e.g., appointments and/or events) that the user typically uses as a time anchor, as described further with respect to FIG. 10. As an example, a monument calendar content item may include a lunch event that is typically scheduled for 12 PM every weekday, a commuting appointment that is typically scheduled for 5 PM every weekday, or a workout event that is typically scheduled for 8 AM on weekends.

Moreover, the identified time patterns are then incorporated into a time mold that is stored with the calendar content data corresponding to the user's map calendar and visually presented to the user via the map calendar GUI. Specifically, as used herein, the term "time mold" refers to a dynamic visual representation and underlying data that categorically define a user's calendar or schedule in terms of repeating time patterns exhibited by the user. In various embodiments, this dynamic visual representation is provided in the form of colored, shaded, or otherwise visually-distinguishable blocks overlaid on the user's map calendar, where each block represents a discrete chunk of time corresponding to one or more particular time categories, as described further with respect to FIG. 1A. In addition, the term "time mold" is also used to reflect the flexible or "moldable" nature of such time molds, which dynamically adapt to changes in the user's scheduling behaviors and time utilization, as evidenced by the calendar content items within the user's map calendar. Moreover, the term "time mold" also conveys the fact that the user's future time patterns can generally be predicted to some extent by the shape of the user's past (and current) time mold; and, as a result, the user is able to visualize their expected time patterns at future points in time using the time mold. Furthermore, as described herein, such time molds are enabled by both the map calendar GUI (which is configured to receive input directly from the user) and the underlying map calendar application itself (which is configured to implement various techniques for categorizing calendar content items).

In various embodiments, the map calendar GUI visually displays or hides the time mold based on user preferences. In particular, the map calendar GUI may include a toggle, button, dropdown list, or other user interface element that enables the user to specify whether the time mold should be visually overlaid onto the user's map calendar. Accordingly, the user is enabled to easily and quickly turn on or off the time mold feature based on their current preferences.

FIG. 1A is a simplified schematic view of an exemplary time mold 100 according to embodiments described herein. As shown in FIG. 1A, the time mold 100 includes a first block 102, a second block 104, and a third block 106, where each block 102, 104, and 106 is colored, shaded, or otherwise visually-distinguishable and represents a discrete chunk of time corresponding to one or more particular time categories. As an example, in some embodiments, the first block 102 may correspond to a personal time category, the second block 104 may correspond to a work time category, and the third block 106 may correspond to a family time category. However, those skilled in the art will appreciate that this is for ease of illustration only, as each block 102, 104, and 106 may correspond to any conceivable time category (or combination of time categories) that are relevant to the particular user.

Moreover, while the blocks 102, 104, and 106 are shown in FIG. 1A as having discrete or well-defined borders, this is also for ease of illustration only, as neighboring blocks may gradually fade into each other for embodiments in which there are one or more overlapping calendar content items between neighboring blocks. In some embodiments, such shaded regions are referred to as "time alloys," where the term "time alloy" is indicative of the manner in which the discrete chunks of time corresponding to such regions combine multiple different time categories into regions of the time mold 100. For example, in some embodiments, a region between the work time category and the family time category on the time mold 100 may be a time alloy (not shown) that is 50% work time and 50% family time. This may be applicable, for example, to the hour that the user spends commuting on weekdays, during which time the user may spend approximately half the time thinking about work and half the time thinking about family. Furthermore, in some cases, such time alloys may be used for scheduling purposes. For example, while a block that is designated as 100% family time may indicate that the user is unlikely to schedule any non-family events during that time, a time alloy that is designated as 50% work time and 50% family time may indicate that the user considers the boundary between work and family to be somewhat blurred and, therefore, may be open to scheduling work or family events during that time. As an example, the user may designate the last hour of their workday as 50% work time and 50% family time to discourage work colleagues from scheduling work meetings during that time; however, the user may still be open to work meetings during that time if it is the only available time to meet.

Furthermore, those skilled in the art will also appreciate that, while only three blocks 102, 104, and 106 are shown in FIG. 1A, the user's map calendar is likely to include a larger number of blocks, depending on the number of time categories that are deemed relevant to the user. In addition, in some embodiments, blocks may optionally be broken up into multiple sub-blocks, depending on the level of detail desired by the user. For example, in some embodiments, a personal time category may be broken up into a sleep time category, a workout time category, and/or a hobby time category. As another example, a work time category may be broken up into a focus time category and a meetings time category. Moreover, in some cases, any of the sub-blocks may be further broken up into additional sub-blocks. For example, the meetings time category may be further broken up into a recurring meetings category, a team meetings category, and/or a one-on-one meetings category. In such embodiments, the map calendar GUI may provide the user with the option of specifying (via a toggle, button, dropdown list, or other suitable user interface element) the level of detail presented by the time mold 100. For example, the user may desire to view the time mold 100 with respect to only the three or four blocks corresponding to the broadest time categories (as shown in FIG. 1A) when looking at their overall schedule but may then desire to view a larger number of sub-blocks corresponding to more specific time categories when analyzing which events, appointments, or the like to reschedule.

Figure 1B:
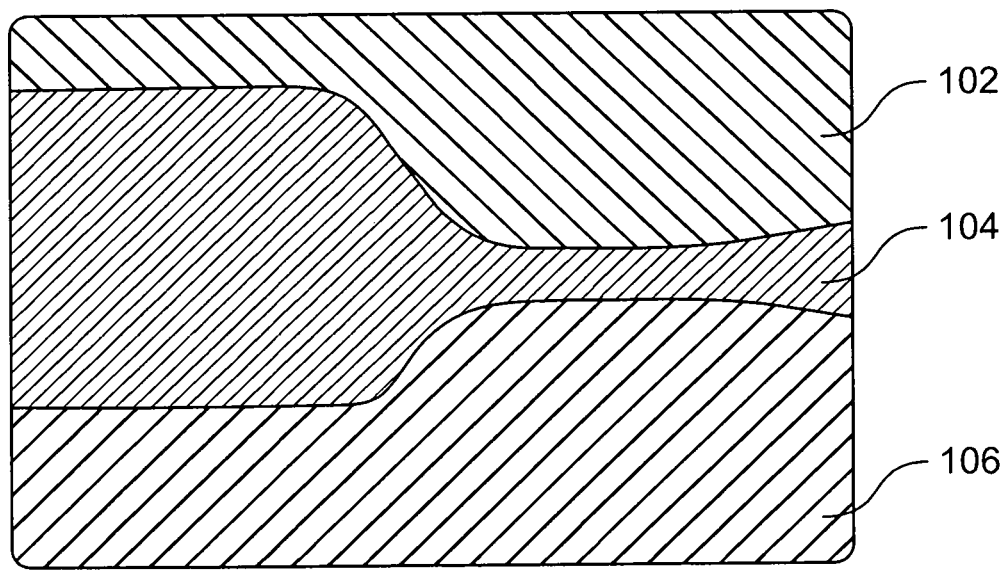
FIG. 1B is a simplified schematic view showing the manner in which the exemplary time mold described with respect to FIG. 1A can dynamically change over time.

FIG. 1B is a simplified schematic view showing the manner in which the exemplary time mold described with respect to FIG. 1A can dynamically change over time. Like numbered items are as described with respect to FIG. 1A. Specifically, as shown in FIG. 1B, the time mold 100 is metaphorically comparable to a physical mold that changes or adapts over time based on variations in the user's time patterns. Moreover, in some embodiments, such variations in the time mold 100 may be observed by simply panning and/or zooming the map calendar within the map calendar GUI to view the map calendar according to different units of time. Accordingly, in various embodiments, implementing the time mold 100 with respect to a map calendar including a continuous, manipulable sequence of data organized as units of time within a coordinate plane allows the user to dynamically view their time patterns over any desired time frame, as described further herein.

Figure 1C:
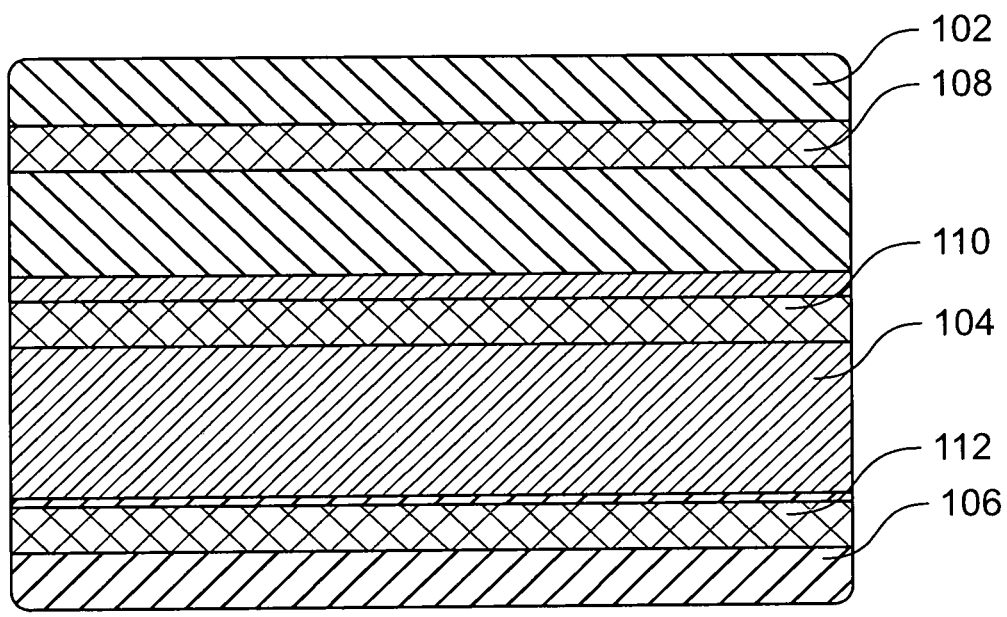
FIG. 1C is a simplified schematic view showing the manner in which monument calendar content items can be associated with the dynamic time mold described with respect to FIGS. 1A and 1B.

FIG. 1C is a simplified schematic view showing the manner in which monument calendar content items can be associated with the dynamic time mold 100 described with respect to FIGS. 1A and 1B. Like numbered items are as described with respect to FIGS. 1A and 1B. Specifically, according to the exemplary embodiment shown in FIG. 1C, the time mold 100 includes a first monument calendar content item 108, a second monument calendar content item 110, and a third monument calendar content item 112. In various embodiments, each monument calendar content item 108, 110, and 112 is visually presented as a colored, shaded, or otherwise visually-distinguishable bar within the time mold 100. In various embodiments, each monument calendar content item 108, 110, and 112 is a particular event, appointment, or the like that the user typically uses as a reference point or anchor for scheduling other items. In other words, each monument calendar content item 108, 110, and 112 provides a means of describing time based on a particular point in time. In other words, each monument calendar content item 108, 110, and 112 may be used as a time divider point. As an example, the first monument calendar content item 108 may be an exercise appointment, and the user may typically plan other items, such as a wake-up time, a showering time, a breakfast time, and the like, around the exercise appointment. As another example, the second monument calendar content item 110 may be a lunch event on weekdays, and the user may typically schedule morning and afternoon meetings such that they fall before or after the lunch event. As another example, the third monument calendar content item 112 may be a commuting appointment (e.g., for carpooling or catching the bus after work) or an appointment for picking kids up from school/daycare, and the user may typically utilize that appointment as a means of mentally and physically transitioning from work time to family time on weekdays. Accordingly, those skilled in the art will appreciate that incorporating such monument calendar content items 108, 110, and 112 into the user's time mold 100 helps to further differentiate time patterns and scheduling behaviors exhibited by the user. This, in turn, enables a richer user interaction with the map calendar GUI.

According to embodiments described herein, the generated time mold is used by the map calendar application (in conjunction with the map calendar GUI) to enable enhanced scheduling functionalities and user scenarios. As an example, the time mold may be used to highlight or otherwise visually-emphasize calendar content items on the user's calendar that "break" the time mold or, in other words, have a time category that does not match the expected time category based on their position or placement in the map calendar. An example of such a "breakthrough" calendar content item would be a personal errand that is scheduled during the user's normal working hours. In some embodiments, the identification of such breakthrough calendar content items may inform the user about inconsistencies with their scheduling behavior, thus allowing the user to modify such behavior.

As another example, the time mold may be used to enable richer visualization opportunities via the map calendar GUI. In particular, the coloring, shading, arrangement, and the like presented by the time mold may allow the user to easily see how they typically allocate their time. This may, in turn, make it easier for the user to compare two periods of time. For example, the user may easily see at-a-glance differences between two days or weeks. In addition, the presence of monument calendar content items within the time mold may make it easier for the user to visualize and analyze their day at a glance. For example, the user may be able to mentally divide calendar content items relating to their workday into morning items and afternoon items based on a lunch event, or the user may be able to mentally divide calendar content items relating to work from calendar content items relating to family based on a commuting event.

As another example, the time mold can be used to enable automatic or semi-automatic scheduling of appointments, events, or the like based on the scheduling intent expressed by the user via the map calendar GUI. For example, if the user wants to go running, the user does not need to explicitly schedule a running appointment. The user may simply tell the map calendar application (via the map calendar GUI), "I want to go running for an hour twice per week." The map calendar application may then use its knowledge of "running" as an exercise activity and the areas of the time mold where the user typically exercises (and/or areas of the time mold that the user has designated as available for exercise) to automatically schedule the running appointment. Alternatively, for semi-automatic scheduling, the map calendar GUI may present the user with a list of possible times (e.g., best fits) for scheduling the running appointment, and the user may manually select the desired time. In addition, if the user later schedules a higher-priority appointment, event, or the like that conflicts with the running appointment, the map calendar may automatically reschedule the running appointment using its knowledge of the time mold. Furthermore, in some embodiments, the time mold enables the user to specify "unmovable" calendar content items, which are calendar content items that the user does not want to reschedule. For example, the user may designate a particular doctor appointment as being unmovable, and the map calendar application may then schedule calendar content items around the doctor appointment without ever rescheduling the doctor appointment.

As another example, the time mold can be shared with, or exposed to, other users to enable enhanced scheduling functionalities between users. For example, if a remote user requests to schedule a meeting with the user, the map calendar application may utilize the user's time mold to determine available times for meeting with the remote user and may be then present such available times to the remote user as the list of possible meeting times. As a more specific example, if the remote user is requesting a work one-on-one meeting, the map calendar application may determine the time range during which the user typically schedules/accepts one-on-one meetings and then present available time within that time range as the list of possible meeting times.

As another example, the time mold may be used to enable the user to tie certain capabilities to certain time frames. For example, if the user has a focus time during their workday, the user (via the map calendar GUI) may specify a particular list of remote users (e.g., their boss and/or certain work colleagues) who are able to send the user messages during such focus time. Similarly, if the user has a doctor appointment, the user may specify a particular list of remote users (e.g., their spouse and/or their babysitter) who are able to send the user messages during the doctor appointment. Accordingly, this enables the user to specify acceptable "breakthrough behavior," which is behavior that does not align with the user's expected utilization of time as indicated by the time mold.

As another example, the time mold may be used to provide enhanced search capabilities. This may be accomplished by querying the time mold, as well as the time categories within the time mold. For example, the user (via the map calendar GUI) may simply tell the map calendar application, "Show me how much free time I had during my work week, or "How much time do I have allocated for exercise each week?" The map calendar application may then search the time mold to find the answer and present such answer to the user, e.g., in the form of a visual presentation, audio response, or the like through the map calendar GUI.

According to embodiments described herein, implementing the time molds within the map calendar application described herein enables various functionalities that would not be enabled using conventional calendar applications. In particular, because the map calendar application provides a map calendar that including a continuous, manipulable sequence of data, the corresponding time mold (along with the map calendar) can be easily manipulated in various ways to enable different interactive visualizations of the time mold. More specifically, the map calendar and corresponding time mold can be panned to scroll across the map calendar and corresponding time mold as though moving across a panorama and zoomed in or out view the map calendar and corresponding time mold according to different units of time. For example, the user may view their time mold for a particular day and then instantly zoom out (via a zoom function performed on the map calendar GUI) to view their time mold for the corresponding week, and then instantly pan over (via a pan function performed on the map calendar GUI) to view their time mold for a neighboring week. Accordingly, the implementation of the time mold within the map calendar application enables the user to dynamically view and interact with the time mold at any desired zoom level and panning position within the coordinate plane.

It should be noted that, while the time molds are described herein primarily with reference to the user visualization provided by the map calendar GUI, such time molds are enabled by the underlying map calendar application itself, which is configured to store calendar content data corresponding to the time molds. These calendar content data are then updated and/or modified in response to user interaction with the map calendar GUI.

Exemplary Implementation of Map Calendar Application to Provide Map Calendar GUI with Dynamic Time Mold Functionality The following is a description of several exemplary implementations of the time molds described herein. Those skilled in the art will appreciate that such exemplary implementations are for illustrative purposes only. In practice, the time molds may be implemented in any other suitable manner based on the details of the particular implementation.

For ease of description, embodiments described herein are illustrated with reference to a map calendar GUI displaying a map calendar with respect to the Gregorian calendar system. However, the present techniques are not limited to a particular calendar system but, rather, may be implemented with respect to any suitable calendar system. Examples of particular calendar systems that may be used according to the present techniques include, but are not limited to, lunar calendar systems, solar calendar systems, religious calendar systems, and/or specific national calendar systems. Examples of other, more specific calendar systems that may be used according to the present techniques include, but are not limited to, the Julian calendar system, the Islamic calendar system, the Hindu calendar system, the Buddhist calendar system, the Hebrew calendar system, and/or the Baha'i calendar system. In addition, non-traditional and/or custom calendar systems may also be used according to the present techniques. For example, a calendar system corresponding to a fiscal year for a particular company or organization may be used. As another example, school and/or college calendar systems may be used, in which case the calendar year may be broken into customized semesters or quarters based on the academic calendar of the particular school or college. Moreover, individual time zones may be regarded as specific calendar systems. For example, for users located within North America, there may be calendar systems corresponding to the Pacific Time Zone, the Mountain Time Zone, the Central Time Zone, and the Eastern Time Zone. Furthermore, calendar systems with values that frequently change may also be used, such as, for example, the daylight savings calendar system and/or the Japanese calendar system. As will be appreciated by those skilled in the art, any number of calendar systems may also be combined into a single calendar system, depending on the details of each particular implementation.

Figure 2A:
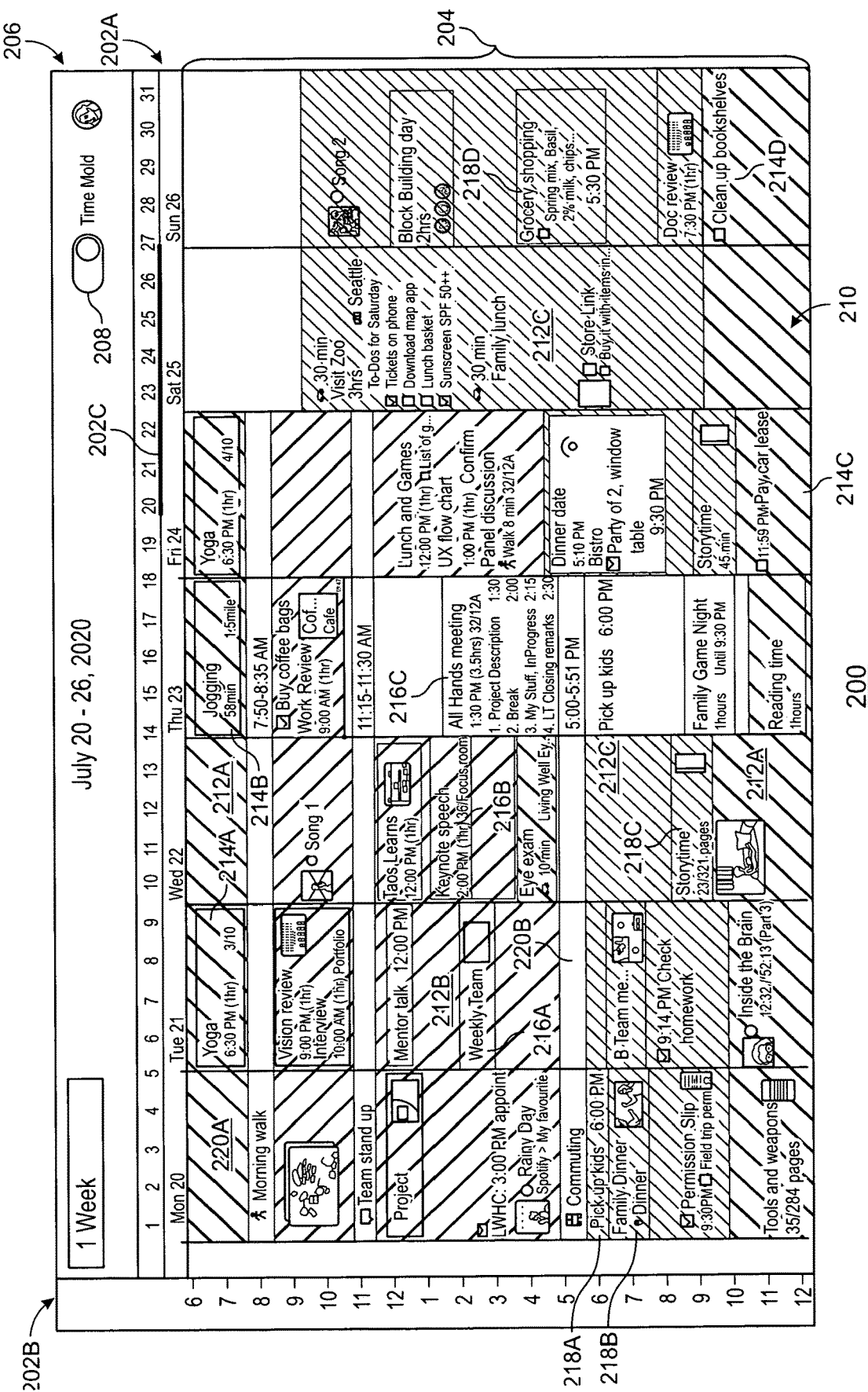
FIG. 2A a schematic view of an exemplary map calendar graphical user interface (GUI) window showing a weekly view of a map calendar with dynamic time mold functionality enabled, as visualized on the display of a computing system.
Figure 8:
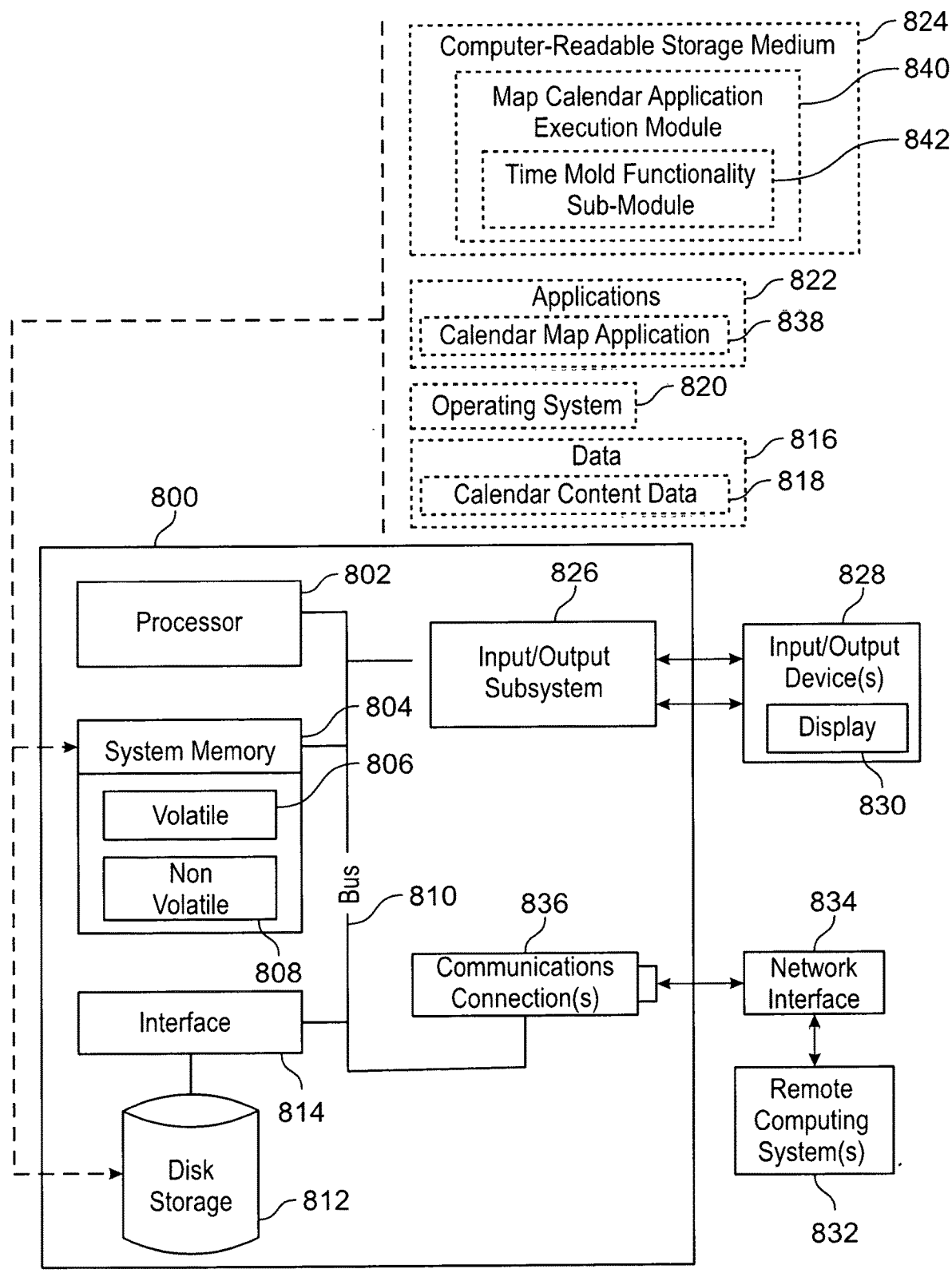
FIG. 8 is a block diagram of an exemplary computing system that can be used to implement the techniques described herein.

FIG. 2A a schematic view of an exemplary map calendar graphical user interface (GUI) window 200 showing a weekly view of a map calendar with dynamic time mold functionality enabled, as visualized on the display of a computing system (such as the computing system described with respect to FIG. 8). In various embodiments, the map calendar GUI enables the user to interact with the map calendar and manipulate the visualization of the map calendar in various ways. In general, manipulation of the map calendar may be defined as a continuous movement of the calendar view via panning across the map calendar and/or zooming in or out of the map calendar. The manipulation of the map calendar can result in the addition of calendar content to the calendar view, or the manipulation can result in the subtraction of calendar content from the calendar view. Moreover, the manipulation of the map calendar may result in any combination of addition or subtraction of the calendar content, where the rendered calendar content is updated in response to the manipulation in a seamless, visually unbroken manner.

For example, a user may pan or scroll along an axis of time presented by the map calendar. In this manipulation, content is added to and subtracted from the calendar view as the view changes to render future or past calendar content at differing times according to the same unit of time. A user may also zoom in or zoom out of a time representation presented by the calendar view. In various embodiments, a zoom-in function results in increasingly smaller units of time rendered by the map calendar. Conversely, a zoom-out function results in increasingly larger units of time rendered by the map calendar. In a zoom-type manipulation, content is added to or subtracted from the calendar view as the view changes to render future or past calendar content at substantially the same points in time, using differing units of time. In this manner, the map calendar GUI provides a dynamic organization of time that can be manipulated by the user. Moreover, the organization of time enabled by the map calendar GUI is not limited by the particular format of the calendar system. In particular, the units of time may be according to any calendar system or combination of calendar systems.

Generally, the map calendar GUI organizes the calendar content for the map calendar according to a coordinate plane. The coordinate plane may include a horizontal axis and a vertical axis, where the horizontal axis and the vertical axis are perpendicular to each other. The horizontal axis may be generally referred to as the X-axis, and the vertical axis may be generally referred to as the Y-axis. According to the embodiment shown in FIG. 2A, both the X-axis and the Y-axis are used to render particular units of time, as illustrated in a first header section 202A and a second header section 202B of the calendar view, respectively. Specifically, the first header section 202A includes the specific day of the week that is being displayed (in ascending order from left to right), while the second header section 202B includes the time (e.g., hour) of day (in ascending order from top to bottom). In addition, in some embodiments, the first header section 202A includes a mini-map showing a broader range of time than the canvas below. In particular, according to the embodiment shown in FIG. 2A, the first header section 202A includes a mini-map of the entire month encompassing the week, with a sliding header bar 202C indicating the week that is currently being displayed within the map calendar GUI window 200.

Moreover, an event section 204 of the calendar view includes calendar content items for each day within the week (as indicated by the first header section 202A) arranged based on the time of day (as indicated by the second header section 202B). However, the map calendar according to the present techniques should not be viewed as limited by particular axes of the coordinate plane but, rather, can be modified according to rules and user preferences. For example, in some embodiments, one axis may be used to represent time, while the other axis may be used to display detailed information regarding specific calendar content items and/or to partition the calendar content items according to calendar content types, where the term "calendar content type" refers to a category associated with a calendar content item. Such calendar content types may include, but are not limited to, particular locations, people, sources, and/or levels of time. Moreover, in some embodiments, the X-axis and/or the Y-axis may be further broken up into smaller intervals such that more detailed information can be shown via the map calendar GUI. For example, according to the embodiment shown in FIG. 2A, the first header section 202A along the X-axis represents time based on the days within the particular week (in the bottom section) and the entire month encompassing the week (in the top section) so that the user is able to view time according to multiple different units within a single calendar view.

As shown in FIG. 2A, the view of the map calendar provided by the map calendar GUI may include a label section 206, one or more header sections (e.g., the first header section 202A and the second header section 202B), and the event section 204. For ease of description, the label section 206, the header sections 202A and 202B, and the event section 204 are positioned in a certain layout. In particular, the label section 206 is illustrated at the top of the rendered map calendar, with the first header section 202A immediately below the label section 206. Further, the event section 204 is illustrated as immediately below the first header section 202A. However, the present techniques are not limited to the particular layout illustrated in FIG. 2A. Rather, the label section 206, the header section(s) 202A and 202B, and the event section 204 can be positioned at any location in the rendered map calendar. Moreover, some sections may be hidden or otherwise removed from the map calendar.

In the illustration of FIG. 2A, the label section 206 provides labels or names associated with the particular unit of time presently rendered by the map calendar. For example, the label section 206 of FIG. 2A is illustrated as including the week of Jul. 20-26, 2020. Accordingly, the map calendar GUI shows a visualization of calendar content items that occur during the week of Jul. 20-26, 2020. Moreover, the map calendar GUI is configured to automatically update the label section 206 in response to the user manipulating the calendar view. Accordingly, the label section 206 enables a dynamic labeling function that corresponds to the unit of time rendered in the current calendar view. Additionally, the label rendered by the label section 206 may be approximate, where the label to be rendered is selected based on a closest or nearest unit of time rendered in the calendar view.

In various embodiments, the event section 204 includes various calendar content items associated with the particular period of time indicated by the label section 206. For example, according to the embodiment shown in FIG. 2A, the event section 204 includes calendar content items that occur within the map calendar during the week of Jul. 20-26, 2020 Such calendar content items may include, but are not limited to, events (e.g., meeting events, work events, social events, and the like), appointments (e.g., appointments that are personal to the user, such as commuting appointments or exercise appointments, or appointments with third parties, such as doctor appointments) media content (e.g., photographs, audio, video, animations, and the like), social networking blurbs (e.g., social status updates, tweets, and the like), links (e.g., links to other applications, links to webpages, and the like), web-browsing history, reminders, lists (e.g. to-do lists, task lists, shopping lists, grocery lists, and the like), and/or documents. Calendar content items may also include applications that are embedded in the calendar surface. Applications embedded in the calendar surface execute within the execution context of the map calendar. In various embodiments, executing an application within the execution context of the map calendar does not require the opening and execution of the application outside of the map calendar GUI. For example, a drawing application may be considered a calendar content item. The drawing application enables a user to share drawings with other users of the map calendar application. The drawing functionality may be executed within the map calendar application, without opening a separate instance of the drawing application.

In various embodiments, calendar content items can have relationships with other calendar content items. The event relationships, the pan level, and the zoom level are factors in how events are rendered in the event section 204. In particular, the relationships, pan level, and zoom level can be used to enable semantic and intelligent summarization of the calendar content items.

Furthermore, according to embodiments described herein, the map calendar GUI provides the user with the option to overlay a corresponding time mold 210 on top of the calendar content items within the event section 204. Specifically, the user may activate or deactivate the view of the time mold 210 via a toggle 208 (or other suitable user interface element) within the label section 206 (or other suitable section) of the interactive visualization.

As shown in FIG. 2A, when the user activates the time mold functionality via the toggle 208, the calendar content items are automatically separated into a number of colored, shaded, or otherwise visually-distinguishable blocks, where each block represents a discrete chunk of time that corresponds to a particular time category (or combination of time categories). Specifically, according to the embodiment shown in FIG. 2A, a first block 212A of the time mold 210 corresponds to a personal time category and, thus, includes calendar content items that correspond to the user's personal time (e.g., a "yoga" appointment 214A, a "jogging" appointment 214B, a "pay car lease" reminder 214C, and a "clean up bookshelves" reminder 214D). A second block 212B of the time mold 210 corresponds to a work time category and, thus, includes calendar content items that correspond to the user's work time (e.g., a "weekly team meeting" event 216A, a "keynote speech" event 216B, an "all-hands meeting" event 216C, and a "panel discussion" event 216D). In addition, a third block 212C of the time mold 210 corresponds to a family time category and, thus, includes calendar content items that correspond to the user's family time (e.g., a "pick up kids" appointment 218A, a "family dinner" event 218B, a "story time" event 218C, and a "grocery shopping" event 218D). Furthermore, as shown in FIG. 2A, the time mold 200 may include any number of colored, shaded, or otherwise visually-distinguishable bars that correspond to monument calendar content items within the user's map calendar, such as, for example, a "morning walk" appointment 220A and a "commuting" appointment 220B. As described herein, this interactive visual representation of the time mold 200 enables various enhanced scheduling functionalities and user scenarios with respect to the map calendar GUI and underlying map calendar application.

Figure 2B:
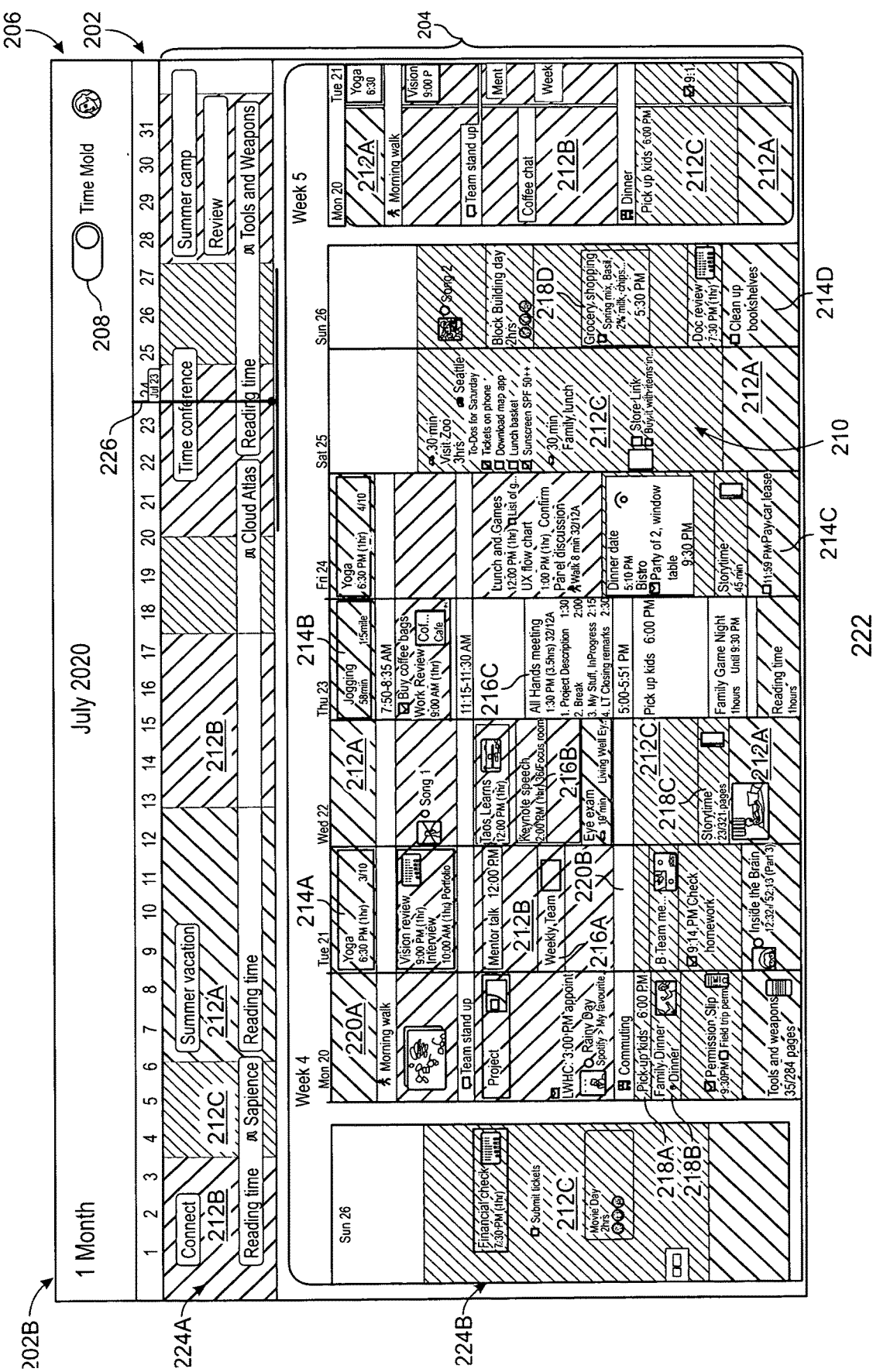
FIG. 2B a schematic view of an exemplary map calendar GUI window showing a portion of an exemplary monthly view of the map calendar of FIG. 2A with dynamic time mold functionality enabled, as visualized on the display of the computing system.

FIG. 2B a schematic view of an exemplary map calendar GUI window 222 showing a portion of an exemplary monthly view of the map calendar of FIG. 2A with dynamic time mold functionality enabled, as visualized on the display of the computing system. Like numbered items are as described with respect to FIG. 2A. The map calendar GUI window 222 of FIG. 2B is similar to the map calendar GUI window 200 of FIG. 2A, except the map calendar GUI window 222 of FIG. 2B represents the entire month of July 2020, rather than just the week of Jul. 20-26, 2020. Moreover, the event section 204 of FIG. 2B is broken up into two separate sections. Specifically, the event section 204 includes an upper section 224A that represents the month according to each day within the month, as well as a lower section 224B that represents a portion of the month according to specific days (e.g., according to the embodiment shown in FIG. 2B, primarily week 4 of the month of July 2020, which is the week of Jul. 20-26, 2020). In this manner, the map calendar GUI enables the user to zoom in on particular portions of the month within the lower section 224B, while still viewing a general overview of the month in the upper section 224A. Moreover, in some embodiments, the map calendar GUI may provide a guide 226 or other user interface element corresponding to the upper section 224A that allows the user to select which portion of the month to display in the lower section 224B.

Figure 3:
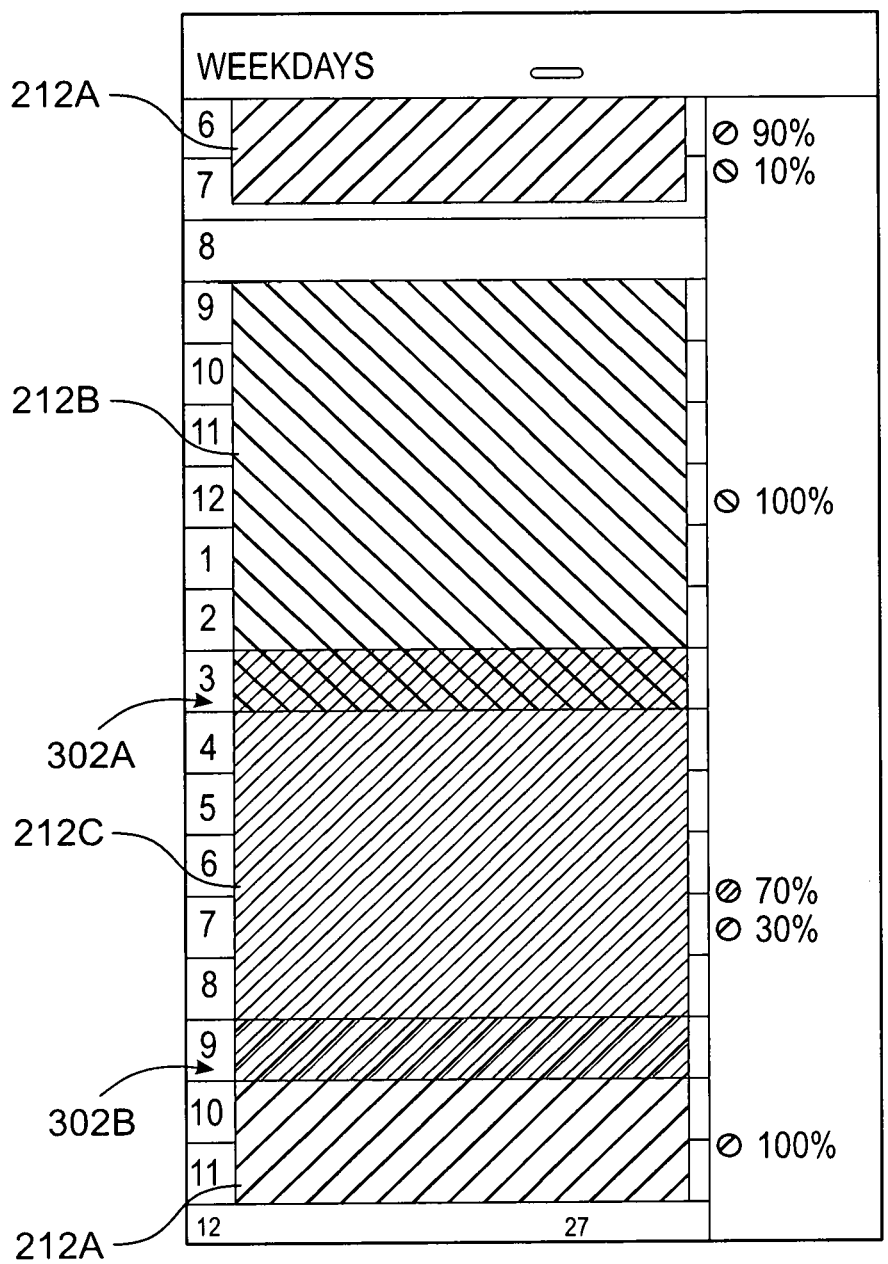
FIG. 3 is a schematic view of an exemplary map calendar GUI window showing a breakdown of time patterns exhibited by a particular time mold, such as the time mold described with respect to FIGS. 2A and 2B.

FIG. 3 is a schematic view of an exemplary map calendar GUI window 300 showing a breakdown of time patterns exhibited by a particular time mold, such as the time mold described with respect to FIGS. 2A and 2B. Like numbered items are as described with respect to FIGS. 2A and 2B. Specifically, the map calendar GUI window 300 shows that 90% of the calendar content items within a morning portion of the first block 212A, which corresponds to the personal time category, are actually personal items for the units of time encompassed by the current view of the time mold, while the remaining 10% of the calendar content items are work items for the units of time encompassed by the current view of the time mold. Similarly, the map calendar GUI window 300 shows that 100% of the calendar content items within the second block 212B, which corresponds to the work time category, are actually work items for the units of time encompassed by the current view of the time mold. The map calendar GUI window 300 also shows that 70% of the calendar content items within the third block 212C, which corresponds to the family time category, are actually family items for the units of time encompassed by the current view of the time mold, while the remaining 30% of the calendar content items are personal items for the units of time encompassed by the current view of the time mold. In addition, the map calendar GUI window 300 shows that 100% of the calendar content items within an evening portion of the first block 212A, which corresponds to the personal time category, are actually personal items for the units of time encompassed by the current view of the time mold. Furthermore, the map calendar GUI window 300 also includes a visual representation of time alloys 302A and 302B within the time mold, where each time alloy 302A and 302B represents overlapping regions between neighboring blocks of the time mold. In various embodiments, the user may utilize the information displayed within the map calendar GUI window 300 of FIG. 3 to visualize, analyze, and/or modify their overall scheduling patterns and behaviors.

Additionally or alternatively, in some embodiments, the breakdown of time patterns shown in FIG. 3 includes desired time pattern breakdowns for particular units of time, as indicated by the user. For example, in some embodiments, the user may manually designate that 70% of the time corresponding to the third block 212C should be associated with the family time category, while the remaining 30% of the time should be associated with the personal time category. In this manner, the user may predetermine the desired breakdown of time categories for given units of time.

Figure 4A:
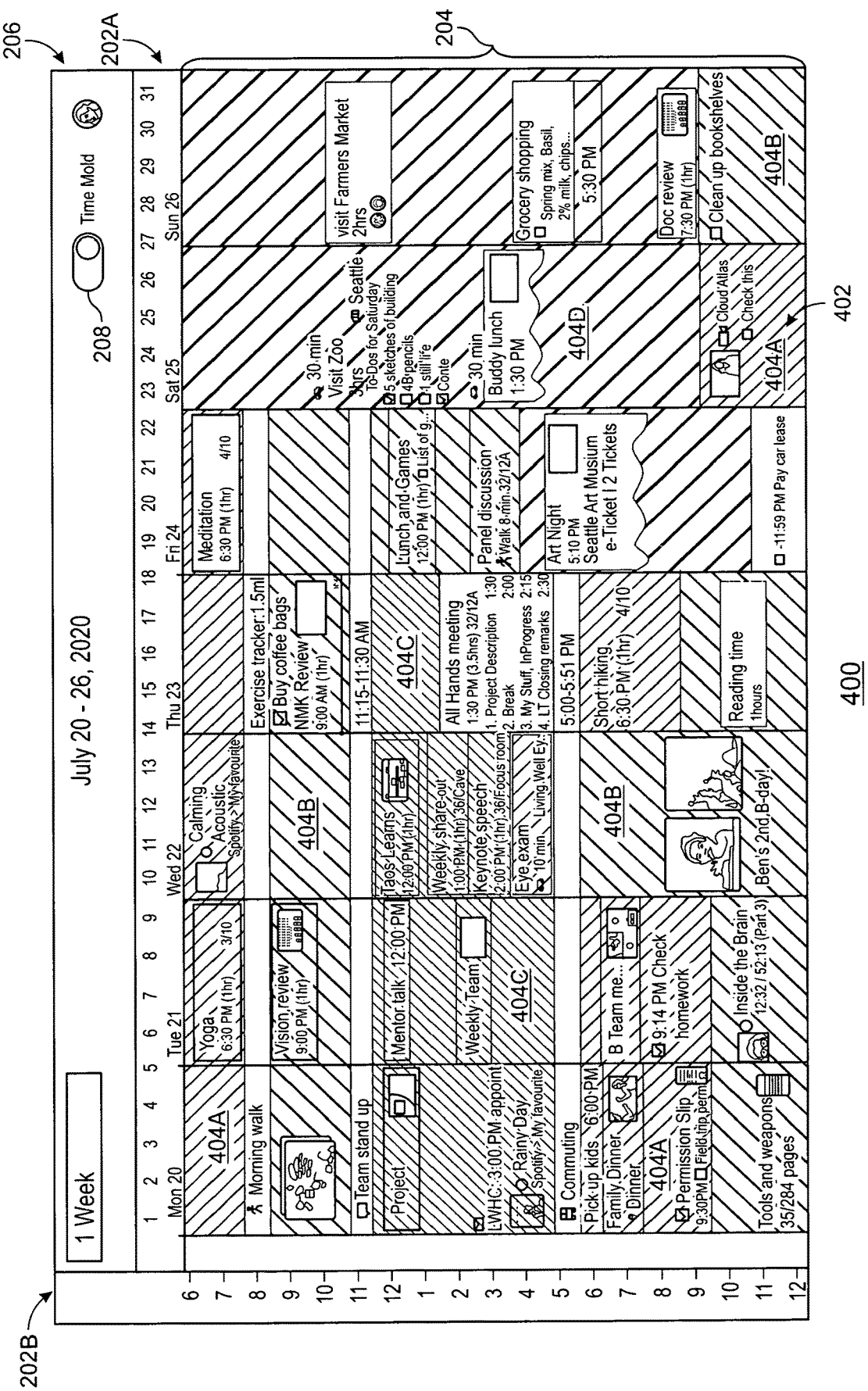
FIG. 4A is a schematic view of an exemplary map calendar GUI window showing a weekly view of a map calendar with dynamic time mold functionality enabled, as visualized on the display of a computing system.

FIG. 4A is a schematic view of an exemplary map calendar GUI window 400 showing a weekly view of a map calendar with dynamic time mold functionality enabled, as visualized on the display of a computing system. Like numbered items are as described with respect to FIGS. 2A and 2B. The map calendar GUI window 400 is similar to the map calendar GUI window 200 of FIG. 2A. Specifically, the map calendar GUI window 400 of FIG. 4A includes the same label section 206, header sections 202A and 202B, and event section 204 as the map calendar GUI window 200 of FIG. 2A. Moreover, the two map calendar GUI windows 400 and 200 also correspond to the same unit of time, namely, the week of Jul. 20-26, 2020. However, the map calendar GUI window 400 of FIG. 4A includes an alternate time mold 402 that is divided into blocks that represent time categories of a different type. In particular, the time mold 402 of FIG. 4A is based on the energy level of the user, with a first block 404A corresponding to a refresh time category, a second block 404B corresponding to a low energy time category, a third block 404C corresponding to a focus energy time category, and a fourth block 404D corresponding to a social energy time category. Accordingly, the time mold 402 of FIG. 4A illustrates how the user can choose to build the time mold based on any desired type(s) of time categories. Moreover, in some embodiments, the map calendar GUI itself may present the user with an option to select one or more specific themes for the time mold, such as, for example, a standard theme, an energy-based theme, or the like.

Figure 4B:
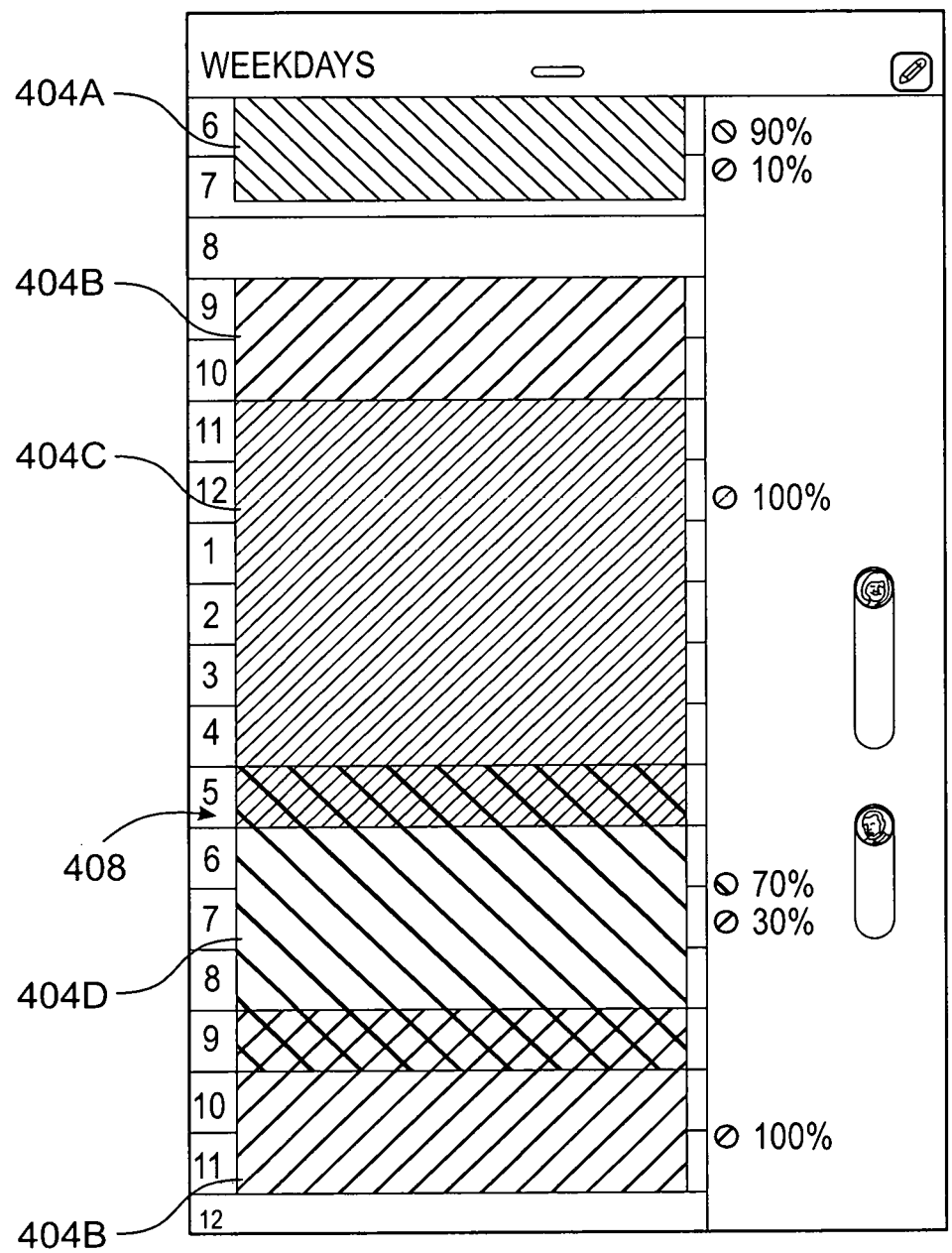
FIG. 4B is a schematic view of an exemplary map calendar GUI window showing a breakdown of time patterns exhibited by the time mold described with respect to FIG. 4A.

FIG. 4B is a schematic view of an exemplary map calendar GUI window 406 showing a breakdown of time patterns exhibited by the time mold described with respect to FIG. 4A. Similarly to the map calendar GUI window 300 of FIG. 3, the map calendar GUI window 406 of FIG. 4B enables the user to easily visualize, analyze, and/or modify their overall scheduling patterns and behaviors based on the percentages of calendar content items corresponding to each time category (and any identified time alloys 408) for the units of time encompassed by the current view of the time mold.

Figure 5:
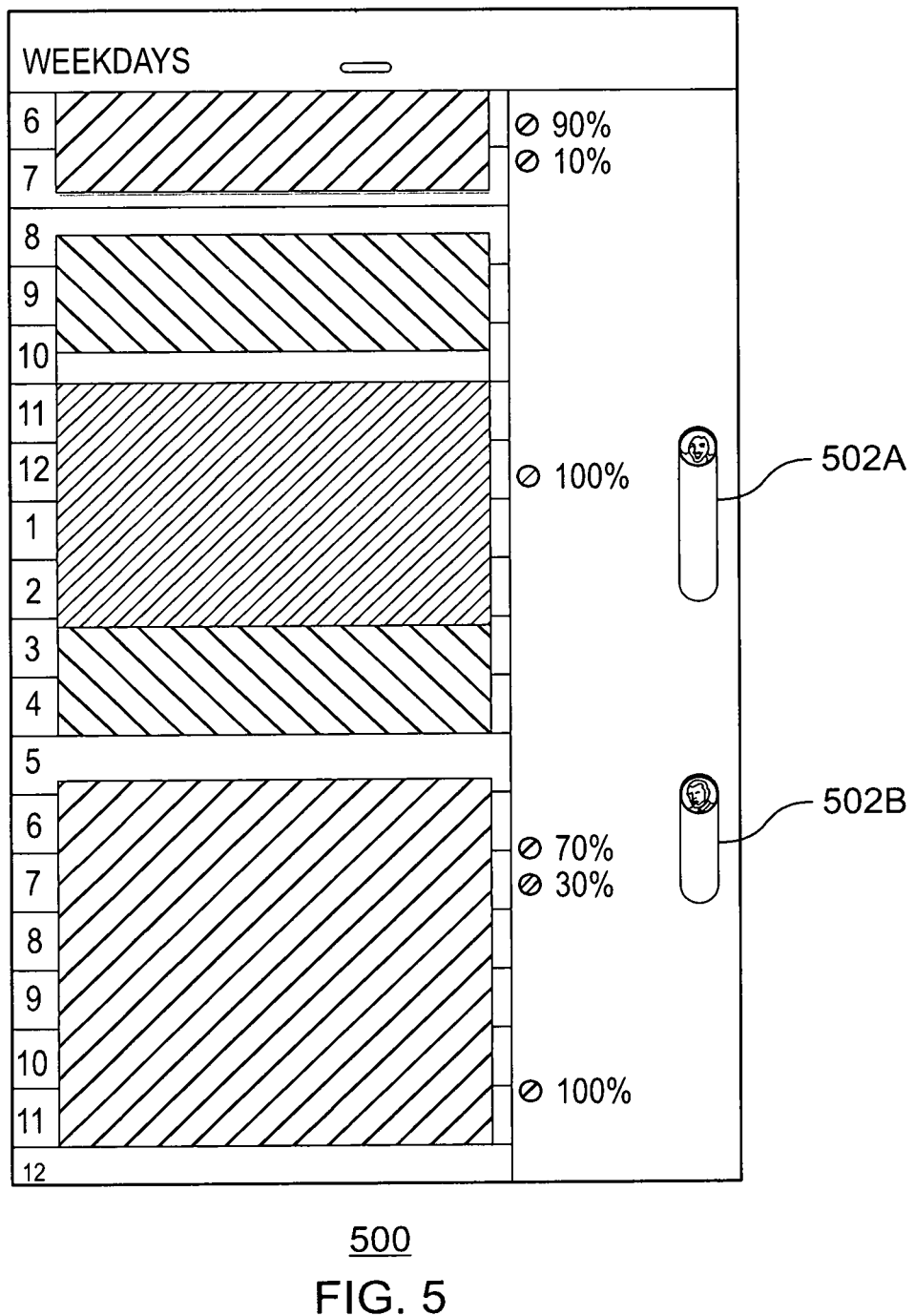
FIG. 5 is a schematic view of an exemplary map calendar GUI window showing the manner in which the time molds described herein can be selectively exposed to remote users.

FIG. 5 is a schematic view of an exemplary map calendar GUI window 500 showing the manner in which the time molds described herein can be selectively exposed to remote users. Specifically, in some embodiments, the user, via any suitable user interface element(s), may designate one or more blocks within the time mold as time periods during which the user does not wish to be disturbed. In addition, the user may optionally designate one or more remote users that are able to "break through" the one or more designated blocks of the time mold. As an example, as shown in FIG. 5, the user may designate a particular time period as a "need to focus" block. In addition, the user may utilize a first user interface element 502A to designate one or more remote users that may break through the "need to focus" block by scheduling events with the user, sending messages to the user, or the like, during the discrete chunk of time corresponding to that block. In response, the map calendar application may enable the designated remote users to break through the "need to focus" block, while preventing all other remote users from doing so. In this manner, the map calendar application assists the user in their goal of focusing. As another example, the user may designate a particular time period as a "meeting time" block. In addition, the user may utilize a second user interface element 502B to designate one or more remote users that may break through the "meeting time" block by scheduling events with the user, sending messages to the user, or the like, during the discrete chunk of time corresponding to that block. In response, the map calendar application may enable the designated remote users to break through the "meeting time" block, while preventing all other remote users from doing so. Accordingly, the time mold functionality described herein enables the user to finetune their utilization of time based on the time patterns exhibited by the calendar content items on their map calendar.

FIG. 6 is a schematic view of an exemplary map calendar GUI window 600 showing the manner in which the time molds described herein enable automatic or semi-automatic scheduling based on the user's time patterns. In particular, as shown in FIG. 6, the map calendar GUI window 600 may include a user prompt to "Tell me what you want to do." The user may then respond with, for example, "Make Game Planner Deck for 3 hours before Friday." In response, the map calendar application may analyze the user's time mold, determine available times that would be a best fit for making a game planner deck for three hours before Friday based, at least in part, on the user's scheduling patterns exhibited by the time mold, and then provide the user with a list of scheduling options via the map calendar GUI window 600, as shown in FIG. 6. In this manner, the map calendar application and corresponding map calendar GUI provide for semi-automatic scheduling based on the time mold. Alternatively, in some embodiments, the map calendar application may automatically schedule the appointment based on the time mold and then simply present the scheduled appointment to the user.

Figure 7:
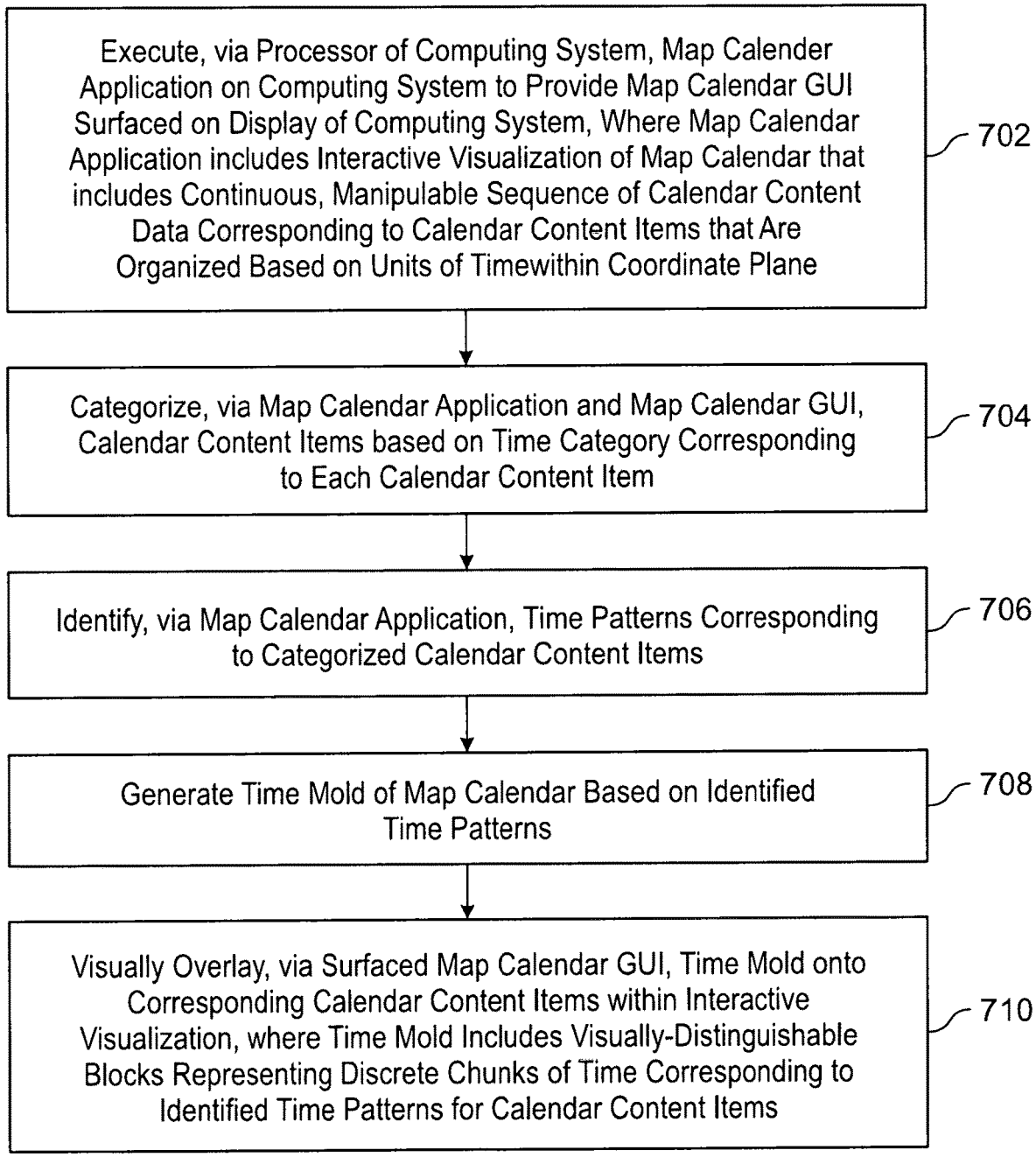
FIG. 7 is a process flow diagram of a method for implementing a map calendar GUI that provides dynamic time mold functionality according to embodiments described herein.

Exemplary Method for Implementing Map Calendar Application and Corresponding Map Calendar GUI with Dynamic Time Mold Functionality FIG. 7 is a process flow diagram of a method 700 for implementing a map calendar GUI that provides dynamic time mold functionality according to embodiments described herein. The method 700 is executed via a computing system including a processor and a display operatively coupled to each other, such as, for example, the computing system described with respect to FIG. 8.

The method 700 begins at block 702, at which a map calendar application is executed on the computing system to provide the map calendar GUI surfaced on the display. The map calendar GUI includes an interactive visualization of a map calendar, where the map calendar includes a continuous, manipulable sequence of calendar content data corresponding to calendar content items that are organized based on units of time within a coordinate plane.

At block 704, the calendar content items are categorized via the map calendar application and the map calendar GUI based on a time category corresponding to each calendar content item. In various embodiments, this includes: (1) categorizing some calendar content items via the map calendar application using machine learning techniques and/or context clues relating to the calendar content items; and (2) categorizing other calendar content items via the map calendar GUI in response to direct user input. In addition, in some embodiments, calendar content items may be categorized using a combination of these two methods.

At block 706, time patterns corresponding to the categorized calendar content items are identified via the map calendar application. In addition at block 708, a time mold of the map calendar is generated by the map calendar application based on the identified time patterns corresponding to the categorized calendar content items. In various embodiments the generated time mold is then stored as part of the calendar content data for the map calendar.

Furthermore, at block 710, the generated time mold is visually overlaid onto corresponding calendar content items within the interactive visualization via the surfaced map calendar GUI. This visual overly of the time mold includes visually-distinguishable blocks representing discrete chunks of time corresponding to the identified time patterns for the calendar content items. In addition, in some embodiments, the visual overlay of the time mold also includes one or more visually-distinguishable bars representing discrete chunks of time corresponding to monument calendar content items, as described herein. Moreover, in various embodiments, the visual overlay of the time mold may be hidden or displayed based on user input (e.g., via a toggle or other suitable user interface element) representing a command to deactivate or activate, respectively, a time mold functionality of the map calendar application.

In various embodiments, the visual overlay of the time mold is displayed relative to a first set of calendar content items encompassed by a first zoom level and a first panning position of the map calendar within the interactive visualization. Moreover, in some embodiments, the method 700 further includes: (1) receiving, via the surfaced map calendar GUI, user input representing a command to navigate to a second zoom level and/or a second panning position of the map calendar; (2) in response to the user input, navigating to the second zoom level and/or the second panning position of the map calendar such that the interactive visualization encompasses a second set of calendar content items; and (3) dynamically adapting, via the surfaced map calendar GUI, the visual overlay of the time mold such that the time mold is displayed relative to the second set of calendar content items.

The block diagram of FIG. 7 is not intended to indicate that the blocks 702-710 of the method 700 are to be executed in any particular order, or that all of the blocks 702-710 of the method 700 are to be included in every case. Moreover, any number of additional blocks may be included within the method 700, depending on the details of the specific implementation. For example, in some embodiments, the method 700 also includes: (1) receiving, via the surfaced map calendar GUI, user input representing a command to schedule a calendar content item, where the command is expressed as a general scheduling intent; (2) analyzing, via the map calendar application, the generated time mold to determine one or more discrete chunks of time that are suitable for scheduling the calendar content item; and (3) automatically or semi-automatically scheduling the calendar content item based on the determined discrete chunk(s) of time, as described herein.

In some embodiments, the method 700 also includes visually-emphasizing one or more calendar content items within the interactive visualization that have time categories that are not expected based on the time mold, as described herein. Moreover, in some embodiments, the method 700 also includes using the time mold, via the surfaced map calendar GUI, to visualize at-a-glance differences between two or more comparable units of time, such as between two neighboring days or two neighboring weeks within the map calendar.

In some embodiments, the method 700 also includes sharing the map calendar with a remote user and enabling the remote user to schedule a shared calendar content item within the map calendar based, at least in part, on the time mold corresponding to the map calendar, as described herein. In some embodiments, the method 700 includes: (1) receiving, via the surfaced map calendar GUI, user input representing a search command; (2) in response, querying the map calendar application based on the time mold to determine an answer; and (3) providing the answer to the user via the surfaced map calendar GUI. Furthermore, in some embodiments, the method 700 also includes receiving, via the surfaced map calendar GUI, user input representing a command to allow specified breakthrough behavior with respect to at least a portion of the time mold (such as, for example, to allow one or more remote users to send messages or schedule events at times that are not expected based on the time mold), as well as enabling, via the map calendar application, the breakthrough behavior.

Exemplary Computing System for Implementing Map Calendar Application and Corresponding Map Calendar GUI with Dynamic Time Mold Functionality FIG. 8 is a block diagram of an exemplary computing system 800 that can be used to implement the techniques described herein. The exemplary computing system 800 includes a processor 802 and a memory 804. The processor 802 may include any suitable type of processing unit or device, such as, for example, a single-core processor, a multi-core processor, a computing cluster, or any number of other configurations. Moreover, the processor 802 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 804 typically (but not always) includes both volatile memory 806 and non-volatile memory 808. The volatile memory 806 retains or stores information so long as the memory is supplied with power. By contrast, the nonvolatile memory 808 is capable of storing (or persisting) information even when a power supply is not available. The volatile memory 806 may include, for example, RAM (e.g., synchronous RAM (SRAM), dynamic RAM (DRAM), synchronous dynamic RAM (SDRAM), and the like) and CPU cache memory. The nonvolatile memory 808 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 802 and the memory 804, as well as other components of the computing system 800, are interconnected by way of a system bus 810. The system bus 810 can be implemented using any suitable bus architecture known to those skilled in the art.

According to the embodiment shown in FIG. 8, the computing system 800 also includes a disk storage 812. The disk storage 812 may include any suitable removable/non-removable, volatile/non-volatile storage component or device. For example, the disk storage 812 may include, but is not limited to, a magnetic disk drive, floppy disk drive, tape drive, Jaz drive, Zip drive, LS-210 drive, flash memory card, memory stick, or the like. In addition, the disk storage 812 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 812 to the system bus 810, a removable or non-removable interface is typically used, such as interface 814 shown in FIG. 8.

In various embodiments, the disk storage 812 and/or the memory 804 are used to store data 816 relating to the techniques described herein. Such data may include, for example, calendar content data 818 relating to one or more map calendars and the corresponding time molds described herein.

Those skilled in the art will appreciate that FIG. 8 describes software that acts as an intermediary between a user of the computing system 800 and the basic computing resources described with respect to the operating environment of the computing system 800. Such software includes an operating system 820. The operating system 820, which may be stored on the disk storage 812, acts to control and allocate the computing resources of the computing system 800. Moreover, system applications 822 take advantage of the management of the computing resources by the operating system 820 through one or more program modules stored within a computer-readable storage medium (or media) 824, as described further herein.

The computing system 800 also includes an input/output (I/O) subsystem 826. The I/O subsystem 826 includes a set of hardware, software, and/or firmware components that enable or facilitate inter-communication between the user of the computing system 800 and the processor 802 of the computing system 800. During operation of the computing system 800, the I/O subsystem 826 enables the user to interact with the computing system 800 through various input/output (I/O) devices 828. Such I/O devices 828 may include any number of input devices or channels, such as, for example, one or more touchscreen/haptic input devices, one or more buttons, one or more pointing devices, one or more accessories, one or more audio input devices, and/or one or more video input devices, such as a camera. As an example, in some embodiments, such input devices or channels include one or more Natural User Interface (NUI) devices, where the term "Natural User Interface (NUI)" refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented-reality and virtual-reality systems, all of which provide a more natural interface. Furthermore, in some embodiments the one or more input devices or channels connect to the processor 802 through the system bus 810 via one or more interface ports (not shown) integrated within the I/O subsystem 826. Such interface ports may include, for example, a serial port, a parallel port, a game port, and/or a universal serial bus (USB).

In addition, such I/O devices 828 may include any number of output devices or channels, such as, for example, one or more audio output devices, one or more haptic feedback devices, and/or one or more display devices, such as display 830. Such output devices or channels may use some of the same types of ports the input devices or channels. Thus, for example, a USB port may be used to both provide input to the computing system 800 and to output information from the computing system 800 to a corresponding output device. Moreover, in some embodiments, the one or more output devices or channels are accessible via one or more adapters (not shown) integrated within the I/O subsystem 826.

In some embodiments, the display 830 is a built-in display screen of the computing system 800. In other embodiments, the display 830 is an external display screen. Moreover, in some embodiments, the display device is a touchscreen that serves as both an input and an output device.

In some embodiments, the computing system 800 may be a server hosting various software applications in a networked environment using logical connections to one or more remote computing systems 832. Such remote computing systems 832 may be, for example, client systems configured with web browsers, PC applications, mobile phone applications, and the like. In addition, the remote computing systems 832 may include, for example, one or more personal computers, one or more servers, one or more routers, one or more network PCs, one or more workstations, one or more microprocessor-based appliances, one or more mobile phones, and/or one or more peer devices or other common network nodes.

In various embodiments, the remote computing devices 832 are logically connected to the computing system 800 through a network interface 834 and then connected via a communication connection 836, which may be wireless. The network interface 834 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 836 includes the hardware/software employed to connect the network interface 834 to the bus 810. While communication connection 836 is shown for illustrative clarity as residing inside the computing system 800, it can also be external to the computing system 800. The hardware/software for connection to the network interface 834 may include, for example, internal and external technologies, such as mobile phone switches, modems including regular telephone grade modems, cable modems and DSL modems, ISDN adapters, and/or Ethernet cards.

As described above, system applications 822, such as the map calendar application 838 described herein, take advantage of the management of the computing resources by the operating system 820 through one or more program modules stored within the computer-readable storage medium (or media) 824. In some embodiments, the computer-readable storage medium 824 is integral to the computing system 800, in which case it may form part of the memory 804 and/or the disk storage 812. In other embodiments, the computer-readable storage medium 824 is an external device that is connected to the computing system 800 when in use.

In various embodiments, the one or more program modules stored within the computer-readable storage medium 824 include program instructions or code that may be executed by the processor 802 to perform various operations, including the techniques described herein. In various embodiments, such program modules include, but are not limited to, a map calendar application execution module 840 that causes the processor 802 to perform operations that result in the execution of the map calendar application 838 to implement a corresponding map calendar GUI including dynamic time mold functionality, as described with respect to the method 700 of FIG. 7, for example. Moreover, in various embodiments, the map calendar application execution module 840 includes one or more sub-modules, where such sub-modules include, but are not limited to, a time mold functionality sub-module 842.

It is to be understood that the block diagram of FIG. 8 is not intended to indicate that the computing system 800 is to include all of the components shown in FIG. 8. Rather, the computing system 800 can include fewer or additional components not illustrated in FIG. 8 (e.g., additional applications, additional modules, additional memory devices, additional network interfaces, etc.). Furthermore, any of the functionalities of the one or more program modules/sub-modules may be partially, or entirely, implemented in hardware and/or in the processor 802. For example, the functionality may be implemented with an application specific integrated circuit, in logic implemented in the processor 802, or in any other device.

Figure 9:
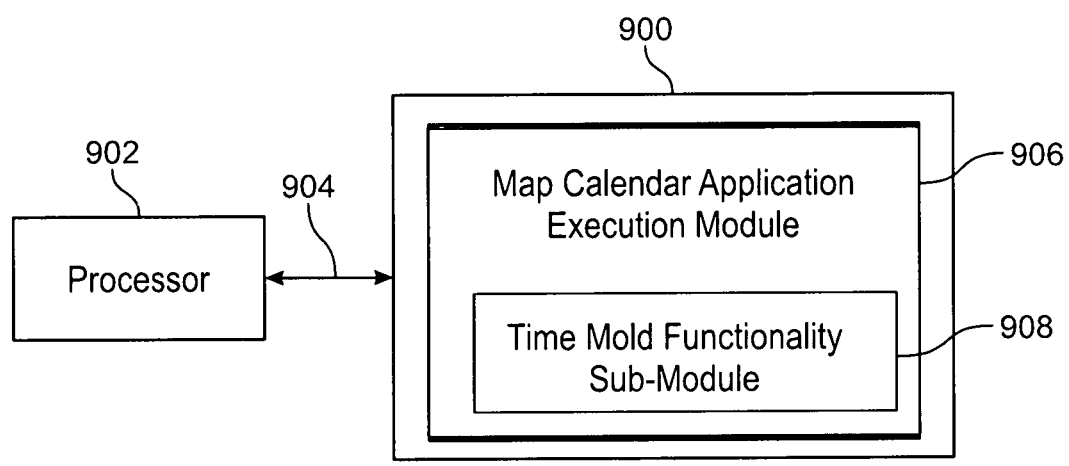
FIG. 9 is a block diagram of an exemplary computer-readable storage medium for implementing a map calendar GUI that provides dynamic time mold functionality according to embodiments described herein.

FIG. 9 is a block diagram of an exemplary computer-readable storage medium 900 for implementing a map calendar GUI including content-variable view levels according to embodiments described herein. In various embodiments, the computer-readable storage medium 900 is accessed by a processor 902 over a computer interconnect 904. For example, the computer-readable storage medium 900 may be the same as, or similar to, the computer-readable storage medium 824 described with respect to the computing system 800 of FIG. 8 and, thus, the computer-readable storage medium 900 may be accessed by the processor 802 of the computing system 800 over the system bus 810.

In various embodiments, the computer-readable storage medium 900 includes code (i.e., computer-executable instructions) to direct the processor 902 to perform the operations of the present techniques. Such code may be stored within the computer-readable storage medium 900 in the form of program modules, where each module includes a set of computer-executable instructions that, when executed by the processor 902, cause the processor 902 to perform a corresponding set of operations. For example, a map calendar application execution module 906, which may include a time mold functionality sub-module 908 (as well as any number of other suitable sub-modules) may direct the processor 902 to perform the techniques described herein (or any suitable variation thereof). Such techniques include, but are not limited to, the method 700 of FIG. 7 for implementing the map calendar GUI that provides the dynamic time mold functionality described herein.

Moreover, it is to be understood that any suitable number of the software components shown in FIG. 9 may be included within the computer-readable storage medium 900. Furthermore, any number of additional software components not shown in FIG. 9 may be included within the computer-readable storage medium 900, depending on the details of the specific implementation.

Furthermore, it should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

EXAMPLES

Example 1 is a method for implementing a map calendar application and a corresponding map calendar graphical user interface (GUI) that provide time mold functionality in a computing system including a processor and a display operatively coupled to each other is described. The method includes executing, via the processor, the map calendar application on the computing system to provide the map calendar GUI surfaced on the display, where the map calendar GUI includes an interactive visualization of a map calendar, and where the map calendar includes a continuous, manipulable sequence of calendar content data corresponding to calendar content items that are organized based on units of time within a coordinate plane. The method also includes categorizing, via the map calendar application and the map calendar GUI, the calendar content items based on a time category corresponding to each calendar content item, as well as identifying, via the map calendar application, time patterns corresponding to the categorized calendar content items. The method further includes generating a time mold of the map calendar based on the identified time patterns corresponding to the categorized calendar content items, as well as visually overlaying, via the surfaced map calendar GUI, the time mold onto corresponding calendar content items within the interactive visualization, where the time mold includes visually-distinguishable blocks representing discrete chunks of time corresponding to the identified time patterns for the calendar content items.

Example 2 includes the method of example 1, including or excluding optional features. In this example, the visual overlay of the time mold is displayed relative to a first set of calendar content items encompassed by a first zoom level and a first panning position of the map calendar within the interactive visualization. In addition, in this example, the method further includes: (1) receiving, via the surfaced map calendar GUI, user input representing a command to navigate to at least one of second zoom level or a second panning position of the map calendar; (2) in response to the user input, navigating to the at least one of the second zoom level or the second panning position of the map calendar such that the interactive visualization encompasses a second set of calendar content items; and (3) dynamically adapting, via the surfaced map calendar GUI, the visual overlay of the time mold such that the time mold is displayed relative to the second set of calendar content items.

Example 3 includes the method of example 1 or 2, including or excluding optional features. In this example, the method includes storing the generated time mold as a portion of the calendar content data for the map calendar.

Example 4 includes the method of any one of examples 1 to 3, including or excluding optional features. In this example, categorizing the calendar content items via the map calendar application and the map calendar GUI includes categorizing at least a portion of the calendar content items via the map calendar application using at least one of machine learning techniques or context clues relating to the calendar content items, as well as categorizing at least a portion of the calendar content items via the map calendar GUI in response to direct user input.

Example 5 includes the method of any one of examples 1 to 4, including or excluding optional features. In this example, the method includes hiding or displaying, via the surfaced map calendar GUI, the visual overlay of the time mold based on user input representing a command to deactivate or activate, respectively, a time mold functionality of the map calendar application.

Example 6 includes the method of any one of examples 1 to 5, including or excluding optional features. In this example, the time mold further includes at least one visually-distinguishable bar representing a discrete chunk of time corresponding to a monument calendar content item.

Example 7 includes the method of any one of examples 1 to 6, including or excluding optional features. In this example, the method includes: (1) receiving, via the surfaced map calendar GUI, user input representing a command to schedule a calendar content item, where the command is expressed as a general scheduling intent; (2) analyzing, via the map calendar application, the generated time mold to determine a discrete chunk of time that is suitable for scheduling the calendar content item; and (3) automatically or semi-automatically scheduling the calendar content item based on the determined discrete chunk of time.

Example 8 includes the method of any one of examples 1 to 7, including or excluding optional features. In this example, the method includes visually-emphasizing at least one calendar content item within the interactive visualization that has a time category that is not expected based on the time mold.

Example 9 includes the method of any one of examples 1 to 8, including or excluding optional features. In this example, the method includes using the time mold, via the surfaced map calendar GUI, to visualize at-a-glance differences between two or more comparable units of time.

Example 10 includes the method of any one of examples 1 to 9, including or excluding optional features. In this example, the method includes sharing the map calendar with a remote user and enabling the remote user to schedule a shared calendar content item within the map calendar based, at least in part, on the time mold corresponding to the map calendar.

Example 11 includes the method of any one of examples 1 to 10, including or excluding optional features. In this example, the method includes: (1) receiving, via the surfaced map calendar GUI, user input representing a search command; (2) in response, querying the map calendar application based on the time mold to determine an answer; and (3) providing the answer to the user via the surfaced map calendar GUI.

Example 12 includes the method of any one of examples 1 to 11, including or excluding optional features. In this example, the method includes receiving, via the surfaced map calendar GUI, user input representing a command to allow specified breakthrough behavior with respect to at least a portion of the time mold, as well as enabling, via the map calendar application, the breakthrough behavior.

Example 13 is a computing system including a processor, a display operatively coupled to the processor, and a computer-readable storage medium operatively coupled to the processor. The computer-readable storage medium includes computer-executable instructions that, when executed by the processor, cause the processor to execute a map calendar application to provide a map calendar GUI surfaced on the display, where the map calendar GUI includes an interactive visualization of a map calendar, and where the map calendar includes a continuous, manipulable sequence of calendar content data corresponding to calendar content items that are organized based on units of time within a coordinate plane. The computer-executable instructions, when executed by the processor, also cause the processor to categorize, via the map calendar application and the map calendar GUI, the calendar content items based on a time category corresponding to each calendar content item, as well as to identify, via the map calendar application, time patterns corresponding to the categorized calendar content items. The computer-executable instructions, when executed by the processor, further cause the processor to generate a time mold of the map calendar based on the identified time patterns corresponding to the categorized calendar content items, as well as to visually overlay, via the surfaced map calendar GUI, the time mold onto corresponding calendar content items within the interactive visualization, where the time mold includes visually-distinguishable blocks representing discrete chunks of time corresponding to the identified time patterns for the calendar content items.

Example 14 includes the computing system of example 13, including or excluding optional features. In this example, the visual overlay of the time mold is displayed relative to a first set of calendar content items encompassed by a first zoom level and a first panning position of the map calendar within the interactive visualization. In addition, in this example, the computer-executable instructions, when executed by the processor, cause the processor to: (1) receive, via the surfaced map calendar GUI, user input representing a command to navigate to at least one of second zoom level or a second panning position of the map calendar; (2) in response to the user input, navigate to the at least one of the second zoom level or the second panning position of the map calendar such that the interactive visualization encompasses a second set of calendar content items; and (3) dynamically adapt, via the surfaced map calendar GUI, the visual overlay of the time mold such that the time mold is displayed relative to the second set of calendar content items.

Example 15 includes the computing system of example 13 or 14, including or excluding optional features. In this example, the computer-executable instructions, when executed by the processor, cause the processor to categorize the calendar content items via the map calendar application and the map calendar GUI by: (1) categorizing at least a portion of the calendar content items via the map calendar application using at least one of machine learning techniques or context clues relating to the calendar content items; and (2) categorizing at least a portion of the calendar content items via the map calendar GUI in response to direct user input.

Example 16 includes the computing system of any one of examples 13 to 15, including or excluding optional features. In this example, the time mold further includes at least one visually-distinguishable bar representing a discrete chunk of time corresponding to a monument calendar content item.

Example 17 includes the computing system of any one of examples 13 to 16, including or excluding optional features. In this example, the computer-executable instructions, when executed by the processor, cause the processor to: (1) receive, via the surfaced map calendar GUI, user input representing a command to schedule a calendar content item, where the command is expressed as a general scheduling intent; (2) analyze, via the map calendar application, the generated time mold to determine a discrete chunk of time that is suitable for scheduling the calendar content item; and (3) automatically or semi-automatically schedule the calendar content item based on the determined discrete chunk of time.

Example 18 includes the computing system of any one of examples 13 to 17, including or excluding optional features. In this example, the computer-executable instructions, when executed by the processor, cause the processor to visually-emphasize at least one calendar content item within the interactive visualization that has a time category that is not expected based on the time mold.

Example 19 is a computer-readable storage medium including computer-executable instructions that, when executed by a processor, cause the processor to execute a map calendar application to provide a map calendar GUI surfaced on a display that is operatively coupled to the processor, where the map calendar GUI includes an interactive visualization of a map calendar, and where the map calendar includes a continuous, manipulable sequence of calendar content data corresponding to calendar content items that are organized based on units of time within a coordinate plane. The computer-executable instructions, when executed by the processor, also cause the processor to categorize, via the map calendar application and the map calendar GUI, the calendar content items based on a time category corresponding to each calendar content item, as well as to identify, via the map calendar application, time patterns corresponding to the categorized calendar content items. The computer-executable instructions, when executed by the processor, further cause the processor to generate a time mold of the map calendar based on the identified time patterns corresponding to the categorized calendar content items, as well as to visually overlay, via the surfaced map calendar GUI, the time mold onto corresponding calendar content items within the interactive visualization, where the time mold includes visually-distinguishable blocks representing discrete chunks of time corresponding to the identified time patterns for the calendar content items.

Example 20 includes the computer-readable storage medium of example 19, including or excluding optional features. In this example, the visual overlay of the time mold is displayed relative to a first set of calendar content items encompassed by a first zoom level and a first panning position of the map calendar within the interactive visualization. In addition, in this example, the computer-executable instructions, when executed by the processor, cause the processor to receive, via the surfaced map calendar GUI, user input representing a command to navigate to at least one of second zoom level or a second panning position of the map calendar. In this example, the computer-executable instructions, when executed by the processor, also cause the processor to, in response to the user input, navigate to the at least one of the second zoom level or the second panning position of the map calendar such that the interactive visualization encompasses a second set of calendar content items. Furthermore, in this example, the computer-executable instructions, when executed by the processor, also cause the processor to dynamically adapt, via the surfaced map calendar GUI, the visual overlay of the time mold such that the time mold is displayed relative to the second set of calendar content items.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for implementing a map calendar application and a corresponding map calendar graphical user interface (GUI) that provide time mold functionality in a computing system comprising a processor and a display operatively coupled to each other, the method comprising:
   executing, via the processor, the map calendar application on the computing system to provide the map calendar GUI surfaced on the display, wherein the map calendar GUI comprises an interactive visualization of a map calendar, and wherein the map calendar comprises a continuous, manipulable sequence of calendar content data corresponding to calendar content items that are organized based on units of time within a coordinate plane;
   categorizing, via the map calendar application and the map calendar GUI, the calendar content items based on a time category corresponding to each calendar content item;
   identifying, via the map calendar application, time patterns corresponding to the categorized calendar content items;
   generating a time mold of the map calendar based on the identified time patterns corresponding to the categorized calendar content items, wherein the time mold comprises a dynamic visual representation and underlying data that categorically define the map calendar based on the identified time patterns, and wherein the time mold dynamically adapts to changes in the identified time patterns over time; and
   visually overlaying, via the surfaced map calendar GUI, the time mold onto corresponding calendar content items within the interactive visualization, wherein the time mold comprises visually-distinguishable blocks representing discrete chunks of time corresponding to the identified time patterns for the calendar content items, and wherein at least a portion of neighboring pairs of the visually-distinguishable blocks gradually fade into each other for regions of the map calendar in which multiple different time categories at least partially overlap in time.

2. The method of claim 1, wherein the visual overlay of the time mold is displayed relative to a first set of calendar content items encompassed by a first zoom level and a first panning position of the map calendar within the interactive visualization, and wherein the method further comprises:
   receiving, via the surfaced map calendar GUI, user input representing a command to navigate to at least one of second zoom level or a second panning position of the map calendar;
   in response to the user input, navigating to the at least one of the second zoom level or the second panning position of the map calendar such that the interactive visualization encompasses a second set of calendar content items; and
   dynamically adapting, via the surfaced map calendar GUI, the visual overlay of the time mold such that the time mold is displayed relative to the second set of calendar content items.

3. The method of claim 1, comprising storing the generated time mold as a portion of the calendar content data for the map calendar.

4. The method of claim 1, wherein categorizing the calendar content items via the map calendar application and the map calendar GUI comprises:
   categorizing at least a portion of the calendar content items via the map calendar application using at least one of machine learning techniques or context clues relating to the calendar content items; and
   categorizing at least a portion of the calendar content items via the map calendar GUI in response to direct user input.

5. The method of claim 1, comprising hiding or displaying, via the surfaced map calendar GUI, the visual overlay of the time mold based on user input representing a command to deactivate or activate, respectively, a time mold functionality of the map calendar application.

6. The method of claim 1, wherein the time mold further comprises at least one visually-distinguishable bar representing a discrete chunk of time corresponding to a monument calendar content item.

7. The method of claim 1, further comprising:
   receiving, via the surfaced map calendar GUI, user input representing a command to schedule a calendar content item, wherein the command is expressed as a general scheduling intent;

analyzing, via the map calendar application, the generated time mold to determine a discrete chunk of time that is suitable for scheduling the calendar content item; and automatically or semi-automatically scheduling the calendar content item based on the determined discrete chunk of time.

8. The method of claim 1, further comprising visually-emphasizing at least one calendar content item within the interactive visualization that has a time category that is not expected based on the time mold.

9. The method of claim 1, further comprising using the time mold, via the surfaced map calendar GUI, to visualize at-a-glance differences between two or more comparable units of time.

10. The method of claim 1, further comprising:
sharing the map calendar with a remote user; and
enabling the remote user to schedule a shared calendar content item within the map calendar based, at least in part, on the time mold corresponding to the map calendar.

11. The method of claim 1, further comprising:
receiving, via the surfaced map calendar GUI, user input representing a search command;
in response, querying the map calendar application based on the time mold to determine an answer; and
providing the answer to the user via the surfaced map calendar GUI.

12. The method of claim 1, comprising:
receiving, via the surfaced map calendar GUI, user input representing a command to allow specified breakthrough behavior with respect to at least a portion of the time mold; and
enabling, via the map calendar application, the breakthrough behavior.

13. A computing system, comprising:
a processor;
a display operatively coupled to the processor; and
a computer-readable storage medium operatively coupled to the processor, the computer-readable storage medium comprising computer-executable instructions that, when executed by the processor, cause the processor to:
execute a map calendar application to provide a map calendar GUI surfaced on the display, wherein the map calendar GUI comprises an interactive visualization of a map calendar, and wherein the map calendar comprises a continuous, manipulable sequence of calendar content data corresponding to calendar content items that are organized based on units of time within a coordinate plane;
categorize, via the map calendar application and the map calendar GUI, the calendar content items based on a time category corresponding to each calendar content item;
identify, via the map calendar application, time patterns corresponding to the categorized calendar content items;
generate a time mold of the map calendar based on the identified time patterns corresponding to the categorized calendar content items wherein the time mold comprises a dynamic visual representation and underlying data that categorically define the map calendar based on the identified time patterns, and wherein the time mold dynamically adapts to changes in the identified time patterns over time; and
visually overlay, via the surfaced map calendar GUI, the time mold onto corresponding calendar content items within the interactive visualization, wherein the time mold comprises visually-distinguishable blocks representing discrete chunks of time corresponding to the identified time patterns for the calendar content items, and wherein at least a portion of neighboring pairs of the visually-distinguishable blocks gradually fade into each other for regions of the map calendar in which multiple different time categories at least partially overlap in time.

14. The computing system of claim 13, wherein the visual overlay of the time mold is displayed relative to a first set of calendar content items encompassed by a first zoom level and a first panning position of the map calendar within the interactive visualization, and wherein the computer-executable instructions, when executed by the processor, cause the processor to:
receive, via the surfaced map calendar GUI, user input representing a command to navigate to at least one of second zoom level or a second panning position of the map calendar;
in response to the user input, navigate to the at least one of the second zoom level or the second panning position of the map calendar such that the interactive visualization encompasses a second set of calendar content items; and
dynamically adapt, via the surfaced map calendar GUI, the visual overlay of the time mold such that the time mold is displayed relative to the second set of calendar content items.

15. The computing system of claim 13, wherein the computer-executable instructions, when executed by the processor, cause the processor to categorize the calendar content items via the map calendar application and the map calendar GUI by:
categorizing at least a portion of the calendar content items via the map calendar application using at least one of machine learning techniques or context clues relating to the calendar content items; and
categorizing at least a portion of the calendar content items via the map calendar GUI in response to direct user input.

16. The computing system of claim 13, wherein the time mold further comprises at least one visually-distinguishable bar representing a discrete chunk of time corresponding to a monument calendar content item.

17. The computing system of claim 13, wherein the computer-executable instructions, when executed by the processor, cause the processor to
receive, via the surfaced map calendar GUI, user input representing a command to schedule a calendar content item, wherein the command is expressed as a general scheduling intent;
analyze, via the map calendar application, the generated time mold to determine a discrete chunk of time that is suitable for scheduling the calendar content item; and
automatically or semi-automatically schedule the calendar content item based on the determined discrete chunk of time.

18. The computing system of claim 13, wherein the computer-executable instructions, when executed by the processor, cause the processor to visually-emphasize at least one calendar content item within the interactive visualization that has a time category that is not expected based on the time mold.

19. A computer-readable storage medium comprising computer-executable instructions that, when executed by a processor, cause the processor to:

execute a map calendar application to provide a map calendar GUI surfaced on a display that is operatively coupled to the processor, wherein the map calendar GUI comprises an interactive visualization of a map calendar, and wherein the map calendar comprises a continuous, manipulable sequence of calendar content data corresponding to calendar content items that are organized based on units of time within a coordinate plane;

categorize, via the map calendar application and the map calendar GUI, the calendar content items based on a time category corresponding to each calendar content item;

identify, via the map calendar application, time patterns corresponding to the categorized calendar content items;

generate a time mold of the map calendar based on the identified time patterns corresponding to the categorized calendar content items, wherein the time mold comprises a dynamic visual representation and underlying data that categorically define the map calendar based on the identified time patterns, and wherein the time mold dynamically adapts to changes in the identified time patterns over time; and visually overlay, via the surfaced map calendar GUI, the time mold onto corresponding calendar content items within the interactive visualization, wherein the time mold comprises visually-distinguishable blocks representing discrete chunks of time corresponding to the identified time patterns for the calendar content items, and wherein at least a portion of neighboring pairs of the visually-distinguishable blocks gradually fade into each other for regions of the map calendar in which multiple different time categories at least partially overlap in time.

20. The computer-readable storage medium of claim 19, wherein the visual overlay of the time mold is displayed relative to a first set of calendar content items encompassed by a first zoom level and a first panning position of the map calendar within the interactive visualization, and wherein the computer-executable instructions, when executed by the processor, cause the processor to:

receive, via the surfaced map calendar GUI, user input representing a command to navigate to at least one of second zoom level or a second panning position of the map calendar;

in response to the user input, navigate to the at least one of the second zoom level or the second panning position of the map calendar such that the interactive visualization encompasses a second set of calendar content items; and dynamically adapt, via the surfaced map calendar GUI, the visual overlay of the time mold such that the time mold is displayed relative to the second set of calendar content items.

* * * * *